US012139031B2

(12) United States Patent
Marczi

(10) Patent No.: US 12,139,031 B2
(45) Date of Patent: Nov. 12, 2024

(54) CHARGING SYSTEM EMPLOYING BATTERY STORAGE

(71) Applicant: MARSCHARGE, INC., Palo Alto, CA (US)

(72) Inventor: Michael David Marczi, Palo Alto, CA (US)

(73) Assignee: MarsCharge, Inc., Mountain View, CA (US)

(*) Notice: Subject to any disclaimer, the term of this patent is extended or adjusted under 35 U.S.C. 154(b) by 401 days.

(21) Appl. No.: 17/382,537

(22) Filed: Jul. 22, 2021

(65) Prior Publication Data

US 2022/0024334 A1 Jan. 27, 2022

Related U.S. Application Data

(60) Provisional application No. 63/218,145, filed on Jul. 2, 2021, provisional application No. 63/210,695, filed
(Continued)

(51) Int. Cl.
*B60L 53/60* (2019.01)
*B60L 53/10* (2019.01)
(Continued)

(52) U.S. Cl.
CPC ............... *B60L 53/60* (2019.02); *B60L 53/11* (2019.02); *B60L 53/14* (2019.02); *B60L 53/16* (2019.02);
(Continued)

(58) Field of Classification Search
CPC .......... B60L 53/60; B60L 53/11; B60L 53/14; B60L 53/16; B60L 53/53; H02J 7/0013; H02J 7/342
(Continued)

(56) References Cited

U.S. PATENT DOCUMENTS 9,864,421 B2 * 1/2018 Li ............................. G06F 1/26
10,283,990 B2 * 5/2019 Fuchs ..................... B60L 53/24
(Continued)

FOREIGN PATENT DOCUMENTS

CN 105102272 A * 11/2015 ............... B60L 1/14
DE 20 2018 002200 U1 6/2018
(Continued)

OTHER PUBLICATIONS

International Search Report and Written Opinion mailed Nov. 2, 2021 for International Application No. PCT/US2021/042731, 13 pages.

*Primary Examiner* — Richard Isla
*Assistant Examiner* — Manuel Hernandez

(57) ABSTRACT

An apparatus that includes a charger, which includes an electric vehicle (EV) connector, a first alternating current (AC) connector, a charger connector, an alternating current and direct current (AC/DC) converter, a DC/DC converter, a charger switch system, which includes a plurality of charger terminals, and a rechargeable battery system coupled between the AC/DC and DC/DC converters. The charger further includes a charger controller coupled to and configured to control the AC/DC converter, the DC/DC converter, and the charger switch system. Charger terminals of the plurality can be respectively coupled to the AC/DC converter, the DC/DC converter, the EV connector, the first AC connector, and the charger connector. The apparatus may also include a hub that includes a hub switch system, which is configured for connection to the charger connector.

16 Claims, 14 Drawing Sheets

Related U.S. Application Data on Jun. 15, 2021, provisional application No. 63/055,590, filed on Jul. 23, 2020.

(51) Int. Cl.
| | |
|---|---|
| *B60L 53/14* | (2019.01) |
| *B60L 53/16* | (2019.01) |
| *B60L 53/53* | (2019.01) |
| *H02J 7/00* | (2006.01) |
| *H02J 7/34* | (2006.01) |

(52) U.S. Cl.
CPC ............ *B60L 53/53* (2019.02); *H02J 7/0013* (2013.01); *H02J 7/342* (2020.01)

(58) Field of Classification Search
USPC .......................................................... 320/109
See application file for complete search history.

(56) References Cited

U.S. PATENT DOCUMENTS

| | | | |
|---|---|---|---|
| 2007/0188130 A1* | 8/2007 | Scheucher | H01M 10/441 |
| | | | 320/110 |
| 2011/0014501 A1* | 1/2011 | Scheucher | B60L 3/0046 |
| | | | 429/7 |
| 2012/0080941 A1* | 4/2012 | Scheucher | H01M 10/625 |
| | | | 307/18 |
| 2012/0169280 A1* | 7/2012 | Chi | H02J 7/007 |
| | | | 320/109 |
| 2013/0049676 A1* | 2/2013 | Ishikawa | B60L 53/53 |
| | | | 320/103 |
| 2015/0002097 A1* | 1/2015 | Kung | H02J 7/0068 |
| | | | 320/128 |
| 2015/0357834 A1* | 12/2015 | McLean | H02J 7/342 |
| | | | 307/31 |
| 2017/0019028 A1* | 1/2017 | Tseng | H02M 7/12 |
| 2018/0034308 A1* | 2/2018 | Burkhart | H02J 7/04 |
| 2018/0097385 A1* | 4/2018 | Li | G06F 1/263 |
| 2018/0297477 A1 | 10/2018 | Stanfield | |
| 2019/0047433 A1* | 2/2019 | Rozman | B60W 20/00 |
| 2019/0241089 A1 | 8/2019 | Heyne et al. | |
| 2019/0243435 A1 | 8/2019 | Chou et al. | |
| 2019/0381906 A1* | 12/2019 | Giebel | B60L 55/00 |
| 2020/0180453 A1* | 6/2020 | Pfeilschifter | H02J 7/02 |
| 2020/0304026 A1* | 9/2020 | Mu | B60L 53/16 |
| 2020/0376969 A1* | 12/2020 | Shorten | H01R 13/6397 |
| 2021/0001742 A1* | 1/2021 | Choi | B60L 50/66 |
| 2021/0070136 A1* | 3/2021 | Schumacher | B60H 1/00014 |
| 2021/0070185 A1* | 3/2021 | Liu | B60L 53/51 |
| 2022/0407320 A1* | 12/2022 | Filice | H01M 50/249 |

FOREIGN PATENT DOCUMENTS

| | | | |
|---|---|---|---|
| DE | 102018206183 A1 * | 10/2019 | |
| WO | WO-2015185452 A1 * | 12/2015 | ............... H02J 1/00 |

* cited by examiner

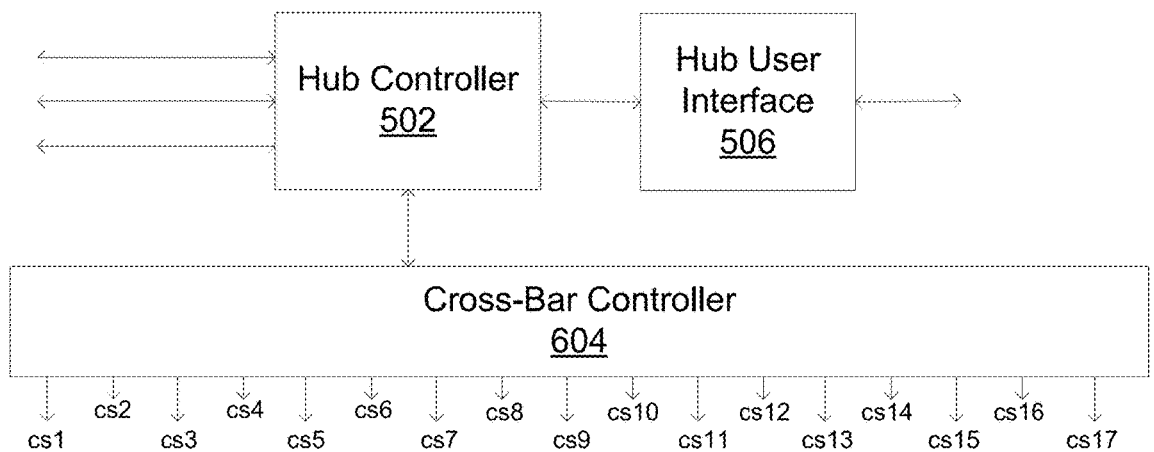
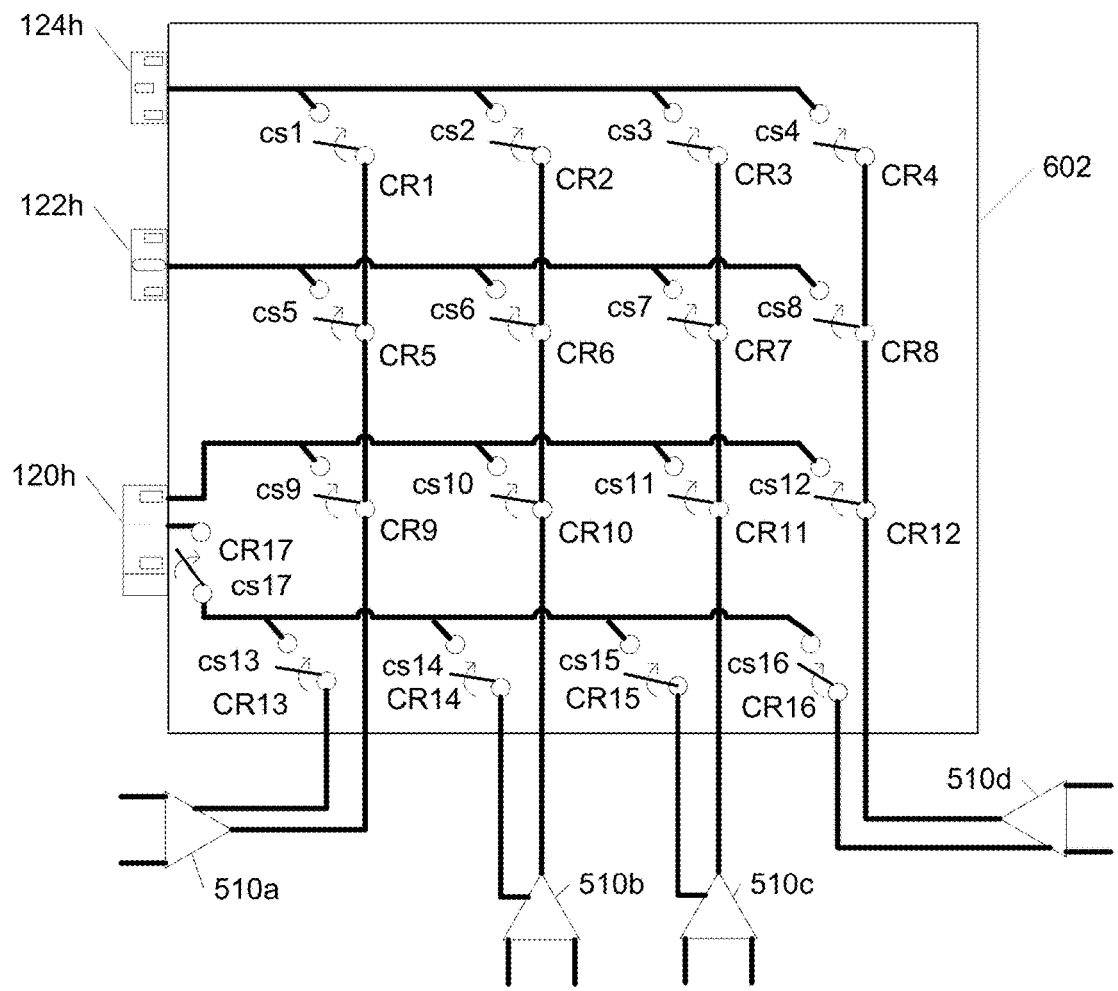
Fig 6

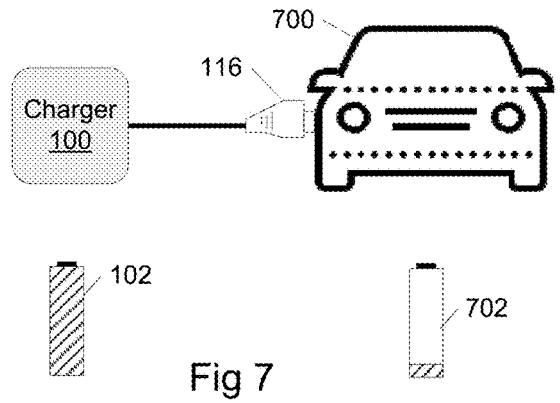
Fig 7
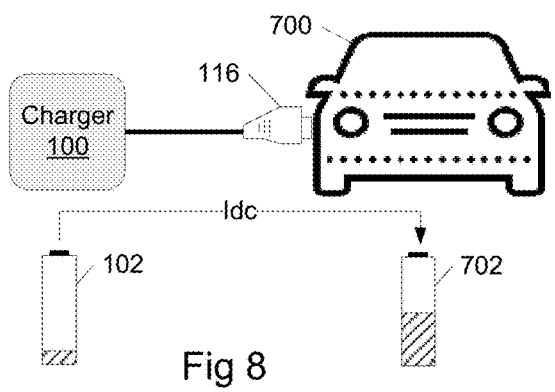
Fig 8
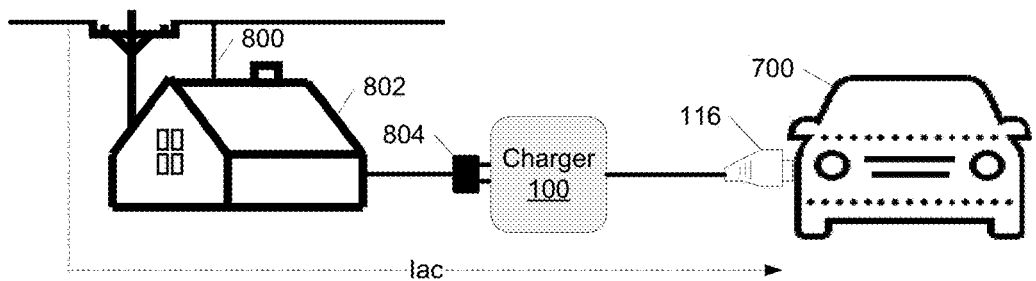
Fig 9
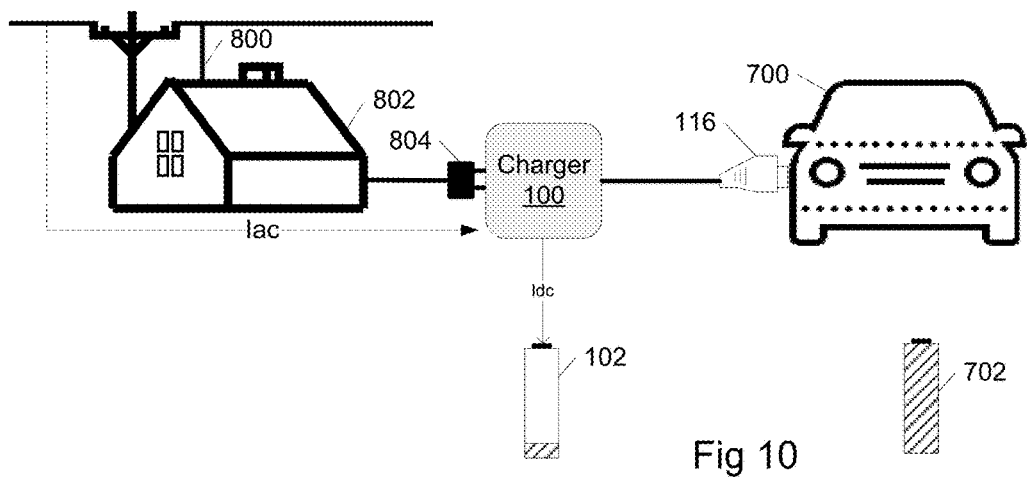
Fig 10

CHARGING SYSTEM EMPLOYING BATTERY STORAGE

CROSS-REFERENCE TO RELATED APPLICATIONS

This application claims the domestic benefit under Title 35 of the United States Code § 119(e) of U.S. Provisional Patent Application Ser. No. 63/055,590, entitled "Electric Power and Storage Systems For Chargers and Charging Networks," filed Jul. 23, 2020, and naming Michael David Marczi as the inventor, U.S. Provisional Patent Application Ser. No. 63/210,695, entitled "Power Management System and Charge Management Systems," filed Jun. 15, 2021, and naming Michael David Marczi as the inventor, and U.S. Provisional Patent Application Ser. No. 63/218,145, entitled "Portable Battery Charger," filed Jul. 2, 2021, and naming Michael David Marczi as the inventor, all of which are hereby incorporated by reference in their entirety and for all purposes as if completely and fully set forth herein.

BACKGROUND

Rechargeable energy storage systems include rechargeable energy storage components (e.g., lithium ion battery cells, super capacitors, fuel cells, etc.). The present disclosure will be described reference to a rechargeable battery cells it being understood that rechargeable energy storage components should not be limited thereto.

A rechargeable battery pack includes one or more rechargeable battery cells (e.g., lithium ion battery cells, solid state battery cells). The present disclosure will be described with reference to rechargeable battery packs (hereafter battery packs) with lithium ion battery cells it being understood that rechargeable battery packs should not be limited thereto.

Electric vehicles (EVs) are powered by battery packs. The present disclosure will be described with reference to EVs, it being understood the present disclosure should not be limited thereto. Electric chargers recharge EV battery packs. Large, stationary chargers (also known as charge points or charging stations) are scattered around urban, suburban, and rural areas for use by owners of EVs. Stationary chargers use power from the public power grid to charge EV batteries.

Stationary charger stations use anyone of several charging methods; AC level-1 charging, AC level-2 charging, DC level-1 charging, and DC level-2 charging. DC level-1 and DC level-2 charging are often collectively referred to as DC level-3 charging. AC level-1 charging typically uses 120-volt AC provided directly or indirectly by the public power grid to charge batteries of EVs. This charging method may have a maximum charging rate of 1.92 kilowatts ("kW"). EVs typically include an on-board AC/DC converter that converts the 120-volt AC into the necessary DC voltage for charging the EV's batteries. AC level-2 charging typically uses 208-volt to 240-volt AC provided directly or indirectly by the public power grid to charge batteries of EVs. This charging method may have a maximum charging rate of 19.2 kW. The EV's on-board AC-DC converter can convert the 208-volt to 240-volt AC into DC voltage for charging the EV's batteries. Level-3 DC charging stations typically convert 480-volt AC power provided directly or indirectly from the public power grid into the DC power necessary to recharge an EV's battery pack. Conversion is performed in equipment external to the EV, and DC current from the stationary charger bypasses the EV's on-board AC/DC converter while the battery is recharging. DC charging can typically range anywhere from 200 to 920-volts DC. DC level-1 may have a maximum charging rate of 48 kW, and DC level-2 may have a maximum charging rate of 400 kW. Depending on the type of charging method used, it may take anywhere from 30 minutes to 45 hours to fully recharge the batteries of an EV. And while DC level-3 charging is usually faster than AC level-1 and AC level-2 charging, batteries are more likely to degrade faster using DC level-3 charging. AC level-1 and AC level-2 chargers will be collectively referred to as AC Chargers and DC level-1 and DC level-2 will be collectively referred to as DC Chargers.

BRIEF DESCRIPTION OF THE DRAWINGS

The present technology may be better understood, and its numerous objects, features, and advantages made apparent to those skilled in the art by referencing the accompanying drawings.

FIG. 6 illustrates one embodiment of a hub relay switch system employed in the hub of FIG. 5.

FIGS. 7 and 8 show the charger of FIG. 1 plugged into an example EV.

FIGS. 9 and 10 show the charger of FIG. 1 plugged into an example EV, and an example household electrical distribution system.

The use of the same reference symbols in different drawings indicates similar or identical items.

DETAILED DESCRIPTION

Figure 1:
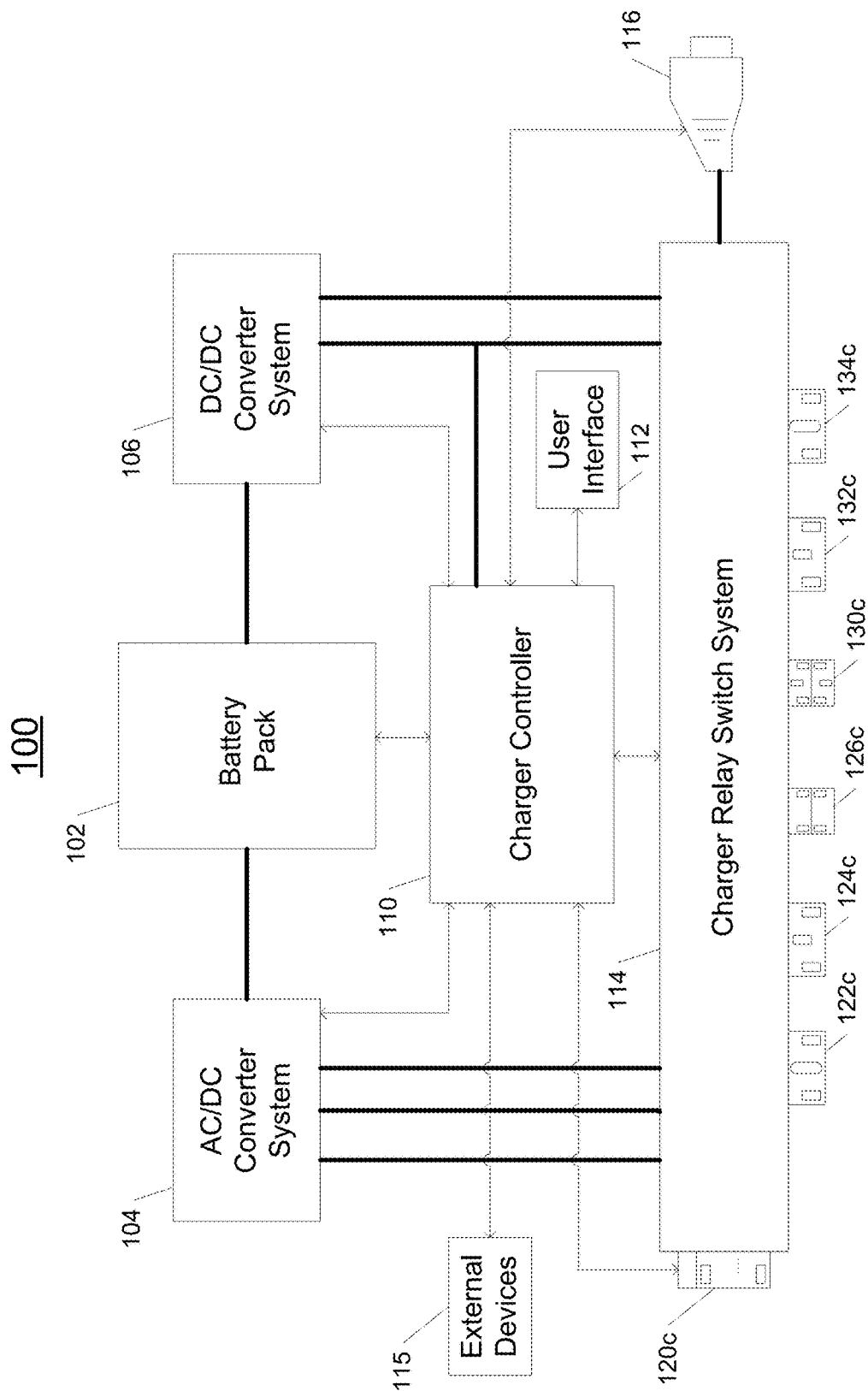
FIG. 1 illustrates a decentralized reserve power charger according to one embodiment of the present disclosure.

"Range anxiety" is the fear that EV batteries do not have enough charge to get drivers to their destination or to the nearest stationary charging station. Range anxiety typically stems from two problems; range provided by an EV's battery pack, and the availability and speed of chargers.

While the average internal combustion engine vehicle typically requires anywhere from 5 to 10 minutes to refill its gasoline (gas) tank at a gas station, a typical 150 kW DC charger typically requires about 68 minutes to recharge a mid-sized sedan EV's battery pack starting from 0% charge. More powerful chargers are not necessarily faster. A 250 kW DC charger does not always provide faster charging, since the amount of charge a battery pack can accept often determines charging speed. During charging, ions pass through the battery's electrolyte to deoxidize intercalated lithium. The individual battery cells have certain resistivity limiting the rate at which ions can pass from the cathode to anode, which determines charging speed. The average American lives an average of 4 minutes from a gas station, while they also live an average of 30 minutes from a DC charging station. If EVs are to surpass internal combustion engine vehicles, DC charging stations need to be more widely available than gas stations.

While the number of DC chargers has been increasing, the total number remains far below that needed to assuage "range anxiety." This is generally due to the costs associated with installing DC chargers, including the infrastructure required to distribute, and convert 480-volt AC power or greater from the public power grid into DC power. Typically, between 30% to 50% of the costs with constructing and installing a DC charging station are associated with using the 480-volt AC public power grid infrastructure as the source.

Disclosed is a decentralized reserve power charger, which can provide DC charging without the need for 480-volt AC power grid infrastructure, and which could eliminate most if not all of the costs associated therewith. 480-volt AC power grid based charger infrastructure is typically large and needs considerable space for installation. The decentralized reserve power charger of the present disclosure can provide DC charging stations where space is limited. The decentralized reserve power charger provides other novel functions as will be more fully described below.

The typical DC charging station that utilizes 480-volt AC power from the public grid, may see reduced power output due to excessive power demands made by other chargers on the grid or by general lack of power output provided by grid itself due to extraneous circumstances. This can be especially true at charging stations located in high traffic areas during peak times such as rush hour. Decentralized reserve power chargers can be integrated with a typical 480-volt AC powered DC charging installation and utilize their reserve power to augment the power loads when needed by intelligently switching the power source, whether the grid or the reserve energy, back and forth to the source with greater power output.

A typical DC charging station can include 480-volt AC grid infrastructure, a power distribution unit, DC chargers, and charging ports for connection to EVs. The process for taking power from the grid and charging an EV's battery pack can generally be described as follows: AC power from the AC grid is transformed to the necessary AC voltage; the transformed AC power is distributed to the various DC chargers, which rectifies AC power to DC power usually via rectification circuitry, DC power is converted again to the proper DC voltage and DC amperage needed by an EV via DC/DC conversion circuitry, and the DC power is subsequently passed to the EV via a charging stall and plug. To summarize, the power conversion steps can be described as, first, AC power is rectified to DC (AC-to-DC) power and, second, rectified DC power is converted to a corrected DC voltage (DC-to-DC).

A charging station may utilize an energy storage system and a solar array as part of the charging station. Typically energy storage and the solar array are DC systems. These DC systems utilize an inverter to invert DC power to AC power (DC-to-AC) to put onto the charging station's AC grid when needed. The energy storage system is usually a single monolithic system that typically has one or more contact points to the station's AC grid. If a charger were to utilize power from such a stored energy system, the power conversion phases could typically be as follows; stored DC power is inverted to AC power and made available on the station's AC grid, AC power is rectified to DC power as described above, and the rectified DC power is then converted again to a DC voltage level necessary to charge EV batteries. To summarize, the power conversion process can typically be DC-to-AC, then AC-to-DC, and finally DC-to-DC.

Various systems described above are usually connected to one another via an AC grid. Decentralized reserve power chargers place the DC energy storage in the DC charging system itself and connects itself to the rest of charging system via bidirectional AC-to-DC conversion/inversion equipment and bidirectional DC-to-DC conversion equipment. This allows energy storage to be distributed among the various decentralized reserve power chargers, which places energy storage in several units, which is contrasted with the typical DC charging station where DC power storage is separate from the charger and is usually monolithic unit. DC power storage within the decentralized reserve power charger allows it to act as power source for both AC and especially DC charging of an EV. The power conversion process would simply mean taking power from the DC storage system and passing it through the DC-to-DC converter, which would provide the necessary power to pass on energy to the EV. The decentralized reserve power charger can receive AC power from the AC grid, rectify the AC power to DC power, convert again the rectified power to a voltage suitable for an EV battery, provide the converted DC power directly to the EV, thereby bypassing energy storage altogether and acting as typical DC charger. It could intelligently switch between the two power sources depending on which produces the greatest power output. The energy storage systems (e.g., battery packs) among the various chargers can also be networked together via DC power lines creating a DC micro grid allowing them to share their stored energy among the various chargers. A decentralized reserve power charger or a network of decentralized reserve power chargers can have an AC grid and a DC grid operating simultaneously and parallel to one another. An individual charger or group of chargers could switch between the AC grid and the DC grid and vice versa depending on the circumstances.

Also, range anxiety can be less of a concern if EV owners carry portable decentralized reserve power chargers in their EVs' trunks or other compartments of their EVs. These portable battery chargers can partially recharge depleted EV batteries. Decentralized reserve power chargers can be configured as portable battery chargers individually and as part of portable charging network of other decentralized reserve power chargers, which all collectively act as network of portable battery chargers working together.

A need exists to reduce the size and weight of chargers to enable a portable battery charger that can be more easily transported with an EV. Current portable battery chargers include a gasoline powered generator for providing the electrical current needed for recharging an EV battery. Gasoline powered portable chargers are large, heavy, and require gasoline.

FIG. 1 illustrates one example of a decentralized reserve power charger 100, it being understood the present disclosure should not be limited thereto. The components shown within FIG. 1 may be contained within a portable case or housing, not shown, which can be the size of a standard suitcase (e.g., 69 cm×47 cm), or as part of larger stationary charger installation, not shown, which can be the size of industrial freezer (e.g., 208 cm×137 cm). The case or housing may include wheels upon which the decentralized reserve power charger 100 can be rolled, or case or housing can be made stationary by embedding it in concrete or by other methods. Among many features described below, decentralized reserve power charger 100 is capable of recharging an EV's battery pack or a plurality of EVs' battery packs using AC level-1 charging, AC level-2 charging, or DC level-3 charging, and switching or sequencing the between the different charging levels in the same or different charging cycles.

Decentralized reserve power charger 100 includes a rechargeable battery pack 102 coupled between a bidirectional AC/DC inverter-converter system 104 and a bidirectional DC/DC converter system 106 via power conductors or wires. The power conductors are illustrated in bold to distinguish them from data communication conductors in the figures.

Charger 100 includes a charger relay switch system 114, which includes a plurality of terminals through which electrical current can be transmitted in or out of switch system 114. Charger relay switch system 114 is capable of connecting any pair of terminals thereof. AC current or DC current can flow between connected terminals. Charger relay system 114 includes sockets 120c-134c, which are electrically connected to respective terminals. AC/DC converter 104 and DC/DC converter 106 are connected to respective terminals of charger relay switch system 114 via power conductors. An EV plug 116 is electrically connected to another terminal of charger relay switch system 114 via a cable.

The decentralized reserve power charger 100 also includes a charger controller 110 with its own lower voltage DC power source. Controller 110 is in data communication with AC/DC converter system 104, battery pack 102, DC/DC converter system 106, a user interface 112, external devices 115, and charger relay switch system 114. Charger controller 110 is in data communication with an EV when EV plug 116 is connected thereto. Charger controller 110 can be in data communication with a power distribution and data communication hub ("hub," more fully described with reference to FIGS. 5 and 6) when socket 120c is connected thereto. Charger controller 110 can be in data communication with other external devices 115 such as but not limited to laptops, tablets, and smart phones via wired connections such as USB or wireless connections such as Long-Term Evolution (LTE) or Wi-Fi communication protocols. The charger controller 110 may include a microcontroller or other data processing unit, which includes a central processing unit that executes instructions stored within memory. Charger controller 110 is configured to process data or commands it receives via interface 112, and to generate commands for configuring operational aspects of AC/DC converter 104, battery pack 102, DC/DC converter system 106, and relay switch system 202 in response to executing instructions stored in the memory. Charger controller 110 may also respond to commands received from the EV or the aforementioned hub when connected thereto.

Several terminals of charger relay switch system 114 are connected to respective sockets 120c-134c. Socket 120c is configured for connection to a hub (not shown in FIG. 1). AC, DC, or AC and DC current can simultaneously flow into or out of socket 120c. Socket 122c is configured for connection to a first AC power grid (e.g., 120 V AC power grid). AC power can flow into or out of socket 122c. Socket 124c is configured for connection to a second AC power grid (e.g., 240 V AC power grid). AC power can flow into or out of socket 124c. Socket 126c is configured for connection to an AC level-1 and AC level-2 charger plug. AC power can flow into socket 126c. Socket 130c is configured for connection to a plug for an appliance that operates on 120 V AC. AC power can flow out of socket 130c. Socket 132c is configured for connection to a plug of an appliance that operates on 240 V AC. AC power can flow out of socket 132c. Socket 134c is configured for connection to devices that operate on low voltage DC. Socket 134c may consist of color-coded positive and negative cables with copper alligator clips at the ends, which could charge a low voltage automotive battery. Often low voltage devices in EVs are powered by traditional lead-acid automobile batteries. Another configuration of socket 134c could be a USB port of the charging of smart phones or smart tablets.

Figure 2:
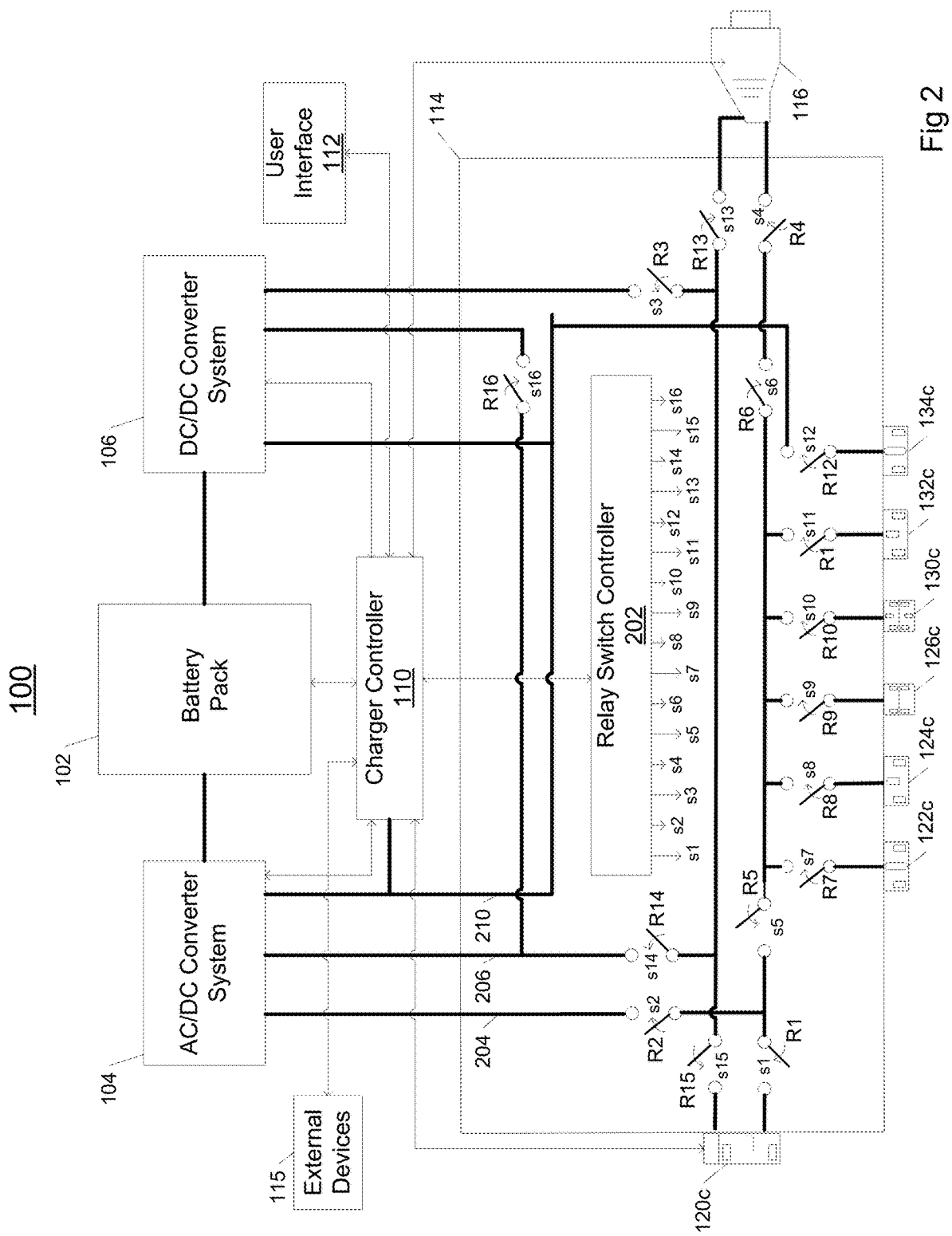
FIG. 2 illustrates one embodiment of a charger relay system employed in the decentralized reserve power charger of FIG. 1.

FIG. 2 illustrates one embodiment of the charger relay system 114 of FIG. 1. As shown, charger relay switch system 114 includes relay switches R1-R16, a relay switch controller 202 in data communication with charger controller 110, and power conductors for transmitting high current (e.g., 1A, 10A, 100A, or more) AC or DC power. There are three types of power lines routed and controlled by the charger relay system. They are AC line 204, high voltage DC line 206, and low voltage DC line 210. The AC line and DC lines can be connected to respective AC and DC grids. The charger's AC line can be connected to the AC grid via sockets 120c-126c, and the charger's high voltage DC line can be connected to the decentralized reserve power charger DC micro grid via socket 120c. Under certain circumstances, the AC line and high voltage DC line could be operating simultaneously with each passing electrical power to or from the charger 100.

The charger's relay switch is electrically operated. There are many different types of relay switches. The traditional form uses an electromagnet to open or close contacts between which current can flow. Although this embodiment uses relays as a switching method for routing power, other switching methods may be used in part or in whole to replace the relays, which could be, for example, power metal-oxide semiconductor field effect transistors (MOSFETS). Relay switches R1-R16 are selectively controlled by signals s1-s16, respectively, provided by relay switch system controller 202. Although not shown, each relay switch R1-R16 has a corresponding return relay switch, and each power conductor has a corresponding return conductor path. A circuit loop can be formed between terminals of charge relay switch system 114 when relay switches and their corresponding return relay switches are closed by respective signals provided by relay switch controller 202.

As noted, charger relay switch system 114 is capable of connecting any pair of terminals thereof. Terminals of relay switching system 114 are respectively connected to AC/DC converter 104, DC/DC converter 106, sockets 120c-134c and EV plug 116. Thus, relay switch system 114 is capable of connecting any two of: AC/DC converter 104; DC/DC converter 106; sockets 120c-134c, and; EV plug 116. For example, relay switch system controller 202 can close relays R3 and R13 while the remaining relays are open. With relays R3 and R13 closed, DC current may flow from battery pack 102 to plug 116 via DC/DC converter system 106, or vice versa. Switches R3 and R15 can be closed while relays R13 and R14 are open. With these switches closed, DC current can flow from battery pack 102 to a hub (not shown) via DC/DC converter 106 and socket 120c, or vice versa. Switches R1 and R2 can be closed while the remaining relay switches are open. With relay switches R1 and R2 closed, AC current can flow from battery pack 102 to a hub (not shown) via AC/DC converter 104 and socket 120c, or vice versa. Switches R2, R5, and R7 can be closed while the remaining relay switches are open. With relay switches R2, R5, and R7 closed, AC current can flow from battery pack 102 to an AC power grid via AC/DC converter system 104 and socket 122c, or vice versa. Switches R1, R4, R5 and R6 can be closed while the remaining relay switches are open. With relay switches R1, R4, R5 and R6 closed, AC current can flow from a hub (not shown) to EV plug 116, or vice versa. Another example would be with relay switches R1, R2, R3, R13, and R16 closed while all other relay switches open, DC current can flow from a connected EV's battery to the DC/DC converter system bypassing the battery pack to connect to the AC/DC converter system, which inverts the DC power to AC power to pass onto to a hub (not shown) via socket 120c, which would subsequently put the AC power on to the grid, and vice versa. Other current paths are contemplated. Concurrent current conduction is also possible as more fully described below.

With continuing reference to FIG. 2, in the case where this system works by utilizing 480-volt AC power or higher, which is a voltage that is typically utilized by other DC chargers, the relay switch system may switch source power for charging an EV from an AC grid, battery pack 102, or the DC grid in no particular order. Any of sockets 122c-124c may be configured to accept 480-volt AC power or higher voltage AC power from a typical charging station infrastructure (e.g. transformer and power distribution units) or from a hub device (not shown) configured for and connected to said infrastructure and to charger 100 via socket 120c. For example, the charger controller 110 determines that DC charging from an AC grid produces the greatest power output, so controller 110 instructs relay switch controller 202 to close switches R1, R2, R3, R13, and R16. AC power flows from 480-volt charging station infrastructure (not shown) to the hub (not shown) to the charger 100 via socket 120c to the AC/DC converter 104 which rectifies AC grid power to DC power that passes on to the DC/DC converter system 106, which converts the voltage magnitude according to the EV battery pack's (not shown) needs and passes on the converted DC power to plug 116. This power conversion process of AC grid to AC-to-DC rectification to DC-to-DC conversion to EV battery pack is virtually identical to a typical DC charger system. However, excessive demands on the AC grid previously mentioned could lead to a drop off in power output, and the charger controller 110 could determine that power output could be greater if the power is provided from the battery pack 102. To that end the charger controller 110 instructs the relay switch controller 202 to open all switches to stop the previous power conversion process, and then to subsequently close switches R3 and R13. DC power from the battery pack 102 would be converted in the DC/DC converter system 106, which is then passed onto the EV's battery pack (not shown) via plug 116. Eventually battery pack 102 drains, but other battery packs from other chargers 100 have fully charged battery packs 102 that are not in use and are connected to a DC micro grid (not shown), which is connected to a hub (not shown), which is connected to charger 100 via socket 120c that is also part of the DC micro grid. The charger controller 110 makes the determination that power from the DC grid would provide greater output than power from the AC grid, so it requests DC power from the hub (not shown) via data communications at socket 120c. The hub (not shown) validates the request and begins to direct another charger to provide its DC power to the hub, which routes the power to charger 100 via socket 120c. With the validation from the hub, charger controller 110 instructs relay switch controller 202 to open all switches to stop the power transfer from battery pack 102 (previously described) and to close switches R13 and R15. DC power is transferred from another charger's battery pack (not shown) through the DC grid (not shown) via a hub (not shown) to the charger 100 via socket 120c and onto the EV's battery pack (not shown) via connector 116. While DC power from the DC grid is being transferred, charger controller 110 requests via data communication through socket 120c from the hub device (not shown) for AC power to recharge its battery pack 102. The request is granted, and the charger controller 110 instructs the relay switch controller to close switches R1 and R2. AC power from the AC grid flows through the hub (not shown) to the charger 100 via socket 120c to the AC/DC converter system 104 which provides the necessary DC power to charge the battery pack 102. AC power and DC power are flowing through charger 100 simultaneously from their respective AC and DC grids. Other current paths are contemplated.

Figure 3:
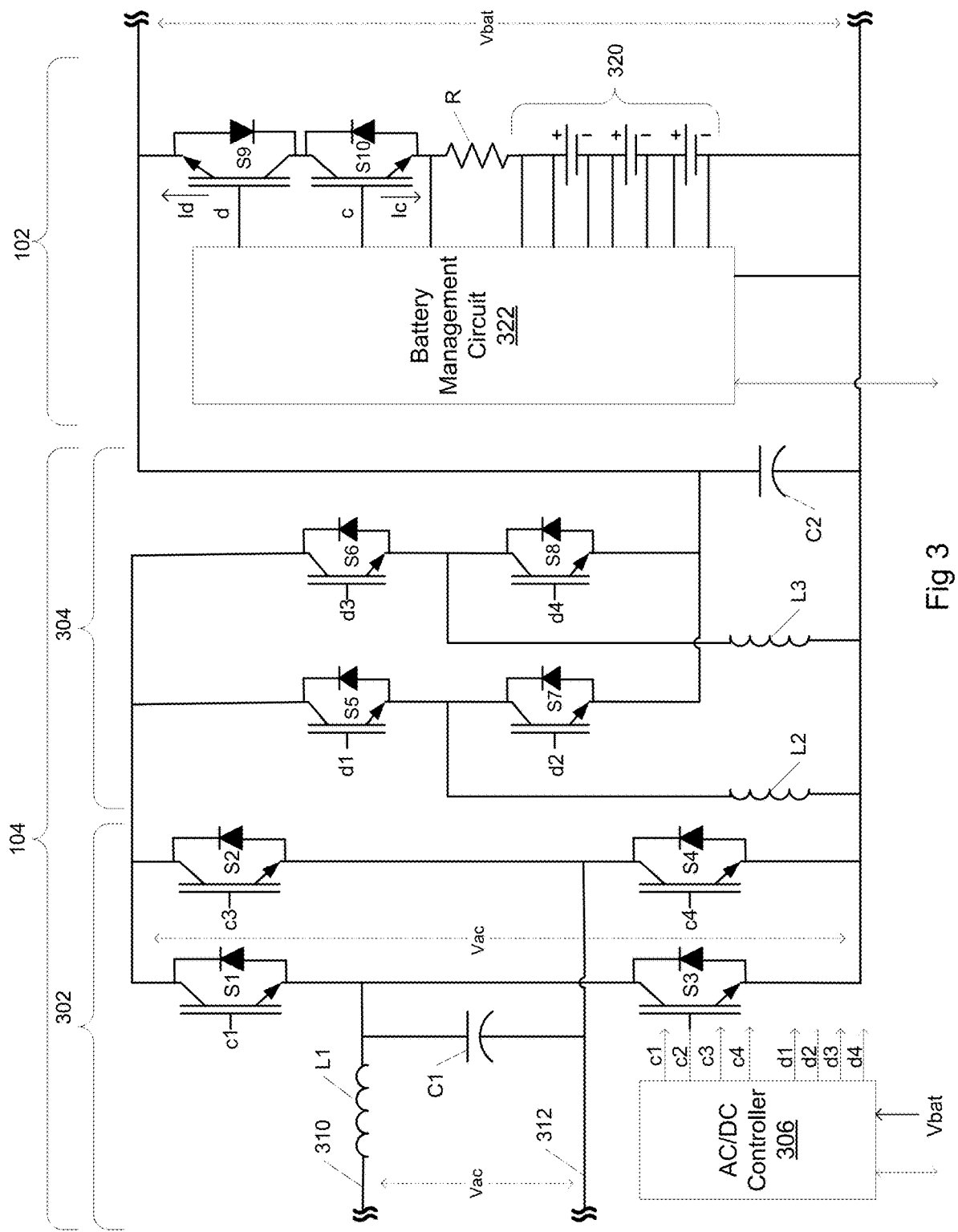
FIG. 3 illustrates an example bidirectional AC/DC converter, and an example battery pack employed in the decentralized reserve power charger of FIG. 1.

With continuing reference to FIGS. 1 and 2, FIG. 3 illustrates an example bidirectional AC/DC converter-inverter (AC/DC converter) 104, and an example battery pack 102. Bidirectional AC/DC converter 104 includes a bidirectional rectifier 302, and a bidirectional, buck-boost DC/DC converter 304. Bidirectional rectifier 302 includes power switches S1-S4, and a filter consisting of inductor L1 and capacitor C1 arranged as shown. The bidirectional DC/DC converter 304 includes power switches S5-S8, capacitor C2 and a pair of inductors L2 and L3 arranged as shown. Gates of switches S1-S8 are controlled by AC/DC controller 306, which in turn is in data communication with and controlled by charger controller 110 shown in FIGS. 1 and 2. Charger controller 110 can place bidirectional AC/DC converter 104 in any one of many different configurations. For example charger controller 110 can configure bidirectional AC/DC converter 104 to generate an AC voltage for use in level-1 charging or level-2 charging. Other example configurations are discussed below. Also, other bidirectional AC/DC converter configurations and battery pack configurations are contemplated.

With continuing reference to FIGS. 2 and 3, rectifier 302 is coupled to power conductor 310 and return conductor 312, which in turn are coupled to relay switch R2 and corresponding return relay switch (not shown), respectively. Rectifier 302 is controlled by AC/DC controller 306. Depending upon its configuration, rectifier 302 can rectify AC voltage Vac into DC voltage Vdc, or vice versa. AC voltage Vac can be received from or provided to any of the sockets 120c-134c, depending upon the configuration of the relay switches as noted above.

Bidirectional DC/DC converter 304 is coupled between rectifier 302 and battery pack 102. Bidirectional DC/DC converter 304 is controlled by AC/DC controller 306. Charger controller 110 can place rectifier 302 and DC/DC converter 304 via AC/DC controller 306 in any one of many different configurations. Depending upon its configuration, bidirectional DC/DC converter 304 can buck or boost DC voltage Vdc to Vbat, or vice versa.

Battery pack 102 includes a plurality of lithium ion cells 320 arranged in series as shown, it being understood other types of cells and other cell arrangements can be employed. Battery pack 102 also includes battery management circuit 322, resistor R and power switches S9 and S10. Battery management circuit 322 includes a microcontroller or other data processing device with a central processing unit that executes instructions stored in memory. Battery management circuit 322 may include additional components (e.g., analog-to-digital converters, thermistors, etc.). Battery management circuit 322 is in data communication with and controlled by charger controller 110. Depending upon its configuration, battery management circuit 322 can control charging of cells 320 via charging current Ic, or battery management circuit 322 can control discharging of cells 320 via discharge current Id. Charging current Ic can flow into the lithium ion cells 320 when battery management circuit 322 activates switch S10 and deactivates switch S9, and discharge current Id flows from ion cells 320 battery management circuit activates switch S9 and deactivates switch S10. Battery management circuit 322 can perform many other functions. For example, battery management circuit 322 monitors aspects lithium ion cells 320 collectively and individually for safe operation. Battery management circuit 322 can balance power between the lithium ion cells 320 ensuring all have equal or almost equal voltage (also known as battery pack balancing). The microcontroller monitors charging current Ic and discharging current Id as it flows through lithium ion cells 320 via resistor R to ensure it does not exceed a maximum value of current. The microcontroller monitors the temperature of lithium ion cells 320 against a predetermined maximum temperature value. Microcontroller controls switches S9 and S10 based upon monitored parameters (e.g., temperature, Ic, Id, etc.) and commands received from charger controller 110. The microcontroller can disconnect the lithium ion cells 320 from either the DC/DC converter system 106 or the AC/DC converter system 104 if the microcontroller determines that the charge within the lithium ion cells drops below a predetermined threshold. Or, the microcontroller may disconnect the lithium ion cells from the AC/DC converter system 104 or the DC/DC converter system 106 if the temperature of the lithium ion cells exceeds a predetermined value. Additionally, the microcontroller may control the process of charging of the lithium ion cells 320. For example, the microcontroller, in response to receiving a command from the charger controller 110, may control the process of recharging of the lithium ion cells 320 based upon a predetermined algorithm. In one embodiment the lithium ion cells 320 can initially be recharged using a constant current. Eventually, the battery management circuit 322 may switch to recharging the lithium ion cells 320 using a constant voltage. Other recharging algorithms are contemplated.

Figure 4:
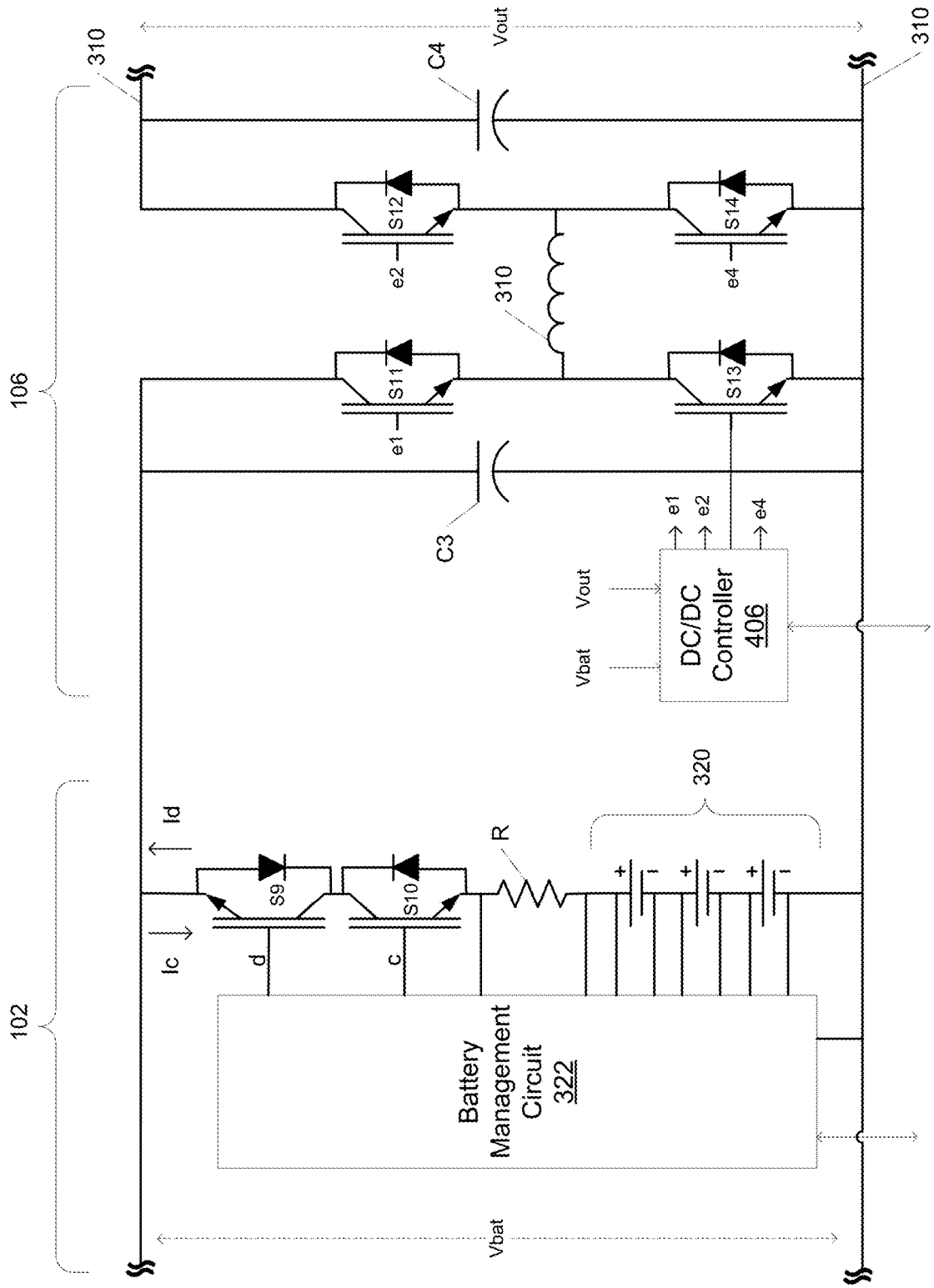
FIG. 4 illustrates an example bidirectional, buck-boost DC/DC converter, and the example battery pack from FIG. 3 employed in the decentralized reserve power charger of FIG. 1.

With continuing reference to FIGS. 2 and 3, FIG. 4 illustrates an example bidirectional, buck-boost DC/DC converter 106, which is coupled to power conductor 402 and return conductor 404, which in turn are coupled to relay switch R3 and corresponding return relay switch (not shown), respectively. Bidirectional DC/DC converter 106 includes power switches S11-S14, an inductor 310, and a pair of capacitors C3 and C4 arranged as shown. Bidirectional DC/DC converter 106 is controlled by DC/DC controller 406. Charger controller 110 can place DC/DC converter 106 in any one of many different configurations via DC/DC controller 406. For example charger controller 110 can configure bidirectional DC/DC converter 106 to generate a DC voltage for use in level-3 charging. Depending upon its configuration bidirectional DC/DC converter 106 can buck or boost DC voltage Vbat to DC voltage Vout, or vice versa. DC voltage Vout can be received from or provided to EV plug 116 or socket 120c, depending upon the configuration of the relay switches as noted above. Other bidirectional, buck-boost DC/DC converter configurations are contemplated.

Figure 5:
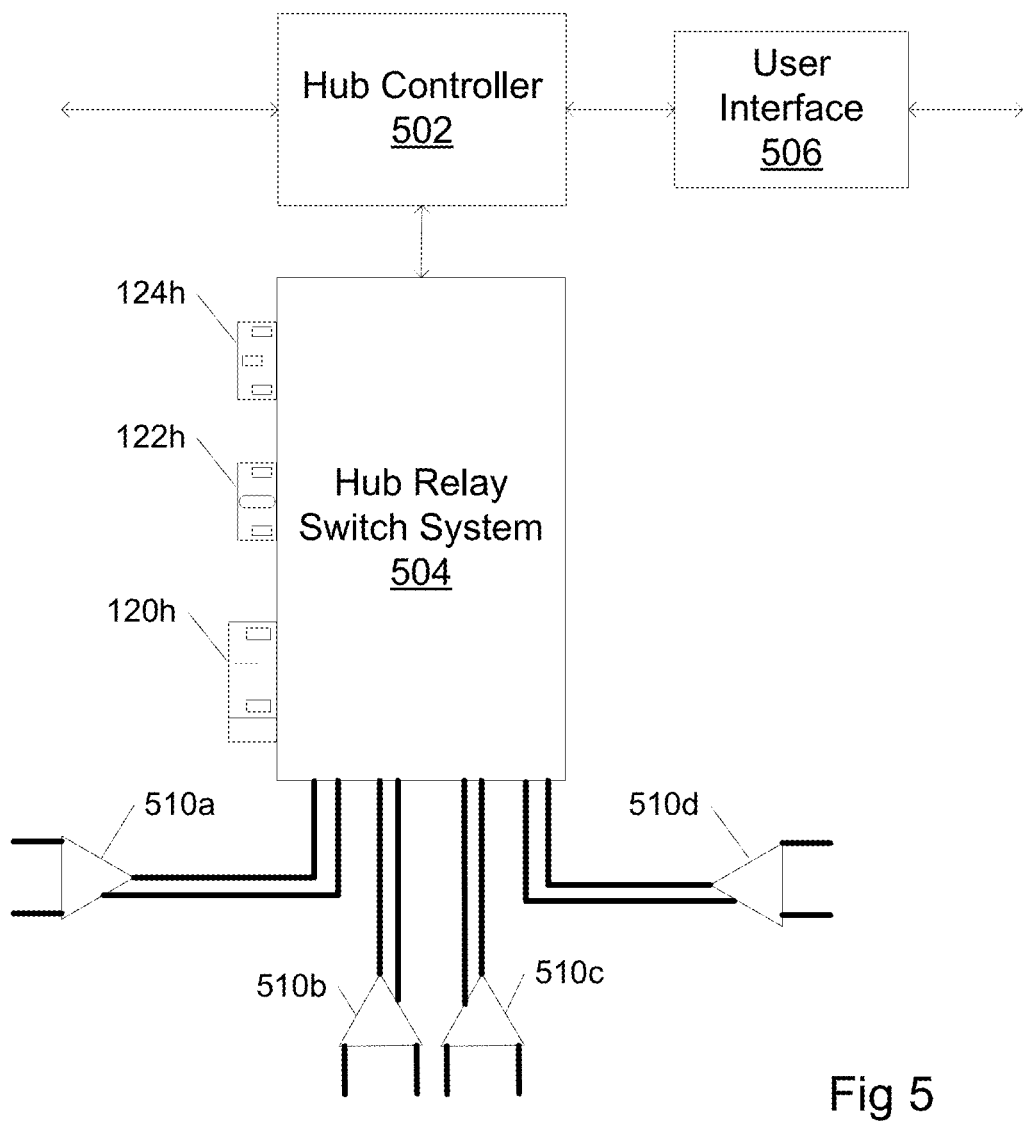
FIG. 5 illustrates an example hub according to one embodiment of the present disclosure.

Charger 100 can be connected to a hub as noted above. FIG. 5 is a block diagram illustrating an example hub 500. Hub 500 can be smaller in size and lighter in weight than charger 100. Charger hub 500 includes a hub controller 502 in data communication with a hub relay switch system 504 and a user interface 506. Although not shown, hub controller 502 can be in data communication with one or more chargers 100, another hub 500 (herein referred to as a domain hub, not shown), or other devices.

Hub relay switch system 504 includes a plurality of terminals through which electrical current can be transmitted into and out of system 504. Hub relay switch system 504 is capable of connecting any pair of terminals thereof. AC current, DC current, or AC and DC current can simultaneously flow between connected terminals. Charger relay system 114 includes socket 120c, which is electrically connected to a terminal of hub relay switch system 504. Charger plugs 510 are electrically connected to other terminals, respectively, of hub relay switch system 504 via cables. Each charger plug 510 is configured for electrical connection with a socket 120c of a respective charger 100. Hub controller 502 can communicate with a charger controller 110 via plug 510 when connected thereto. Hub controller 500 can be in data communication with multiple charger controllers 110 via respective plugs 510. The hub controller 110 may include a microcontroller or other data processing device, which includes a central processing unit that executes instructions stored within memory. Hub controller 110 is configured to process data or commands it receives, and to generate commands in response to executing instructions stored in the memory. For example, hub controller 110 can issue commands for configuring hub relay switch system 504.

As noted above, each of the hub relay switch system 504 terminals is connected to a respective one of the socket 120h-124h, and charger plugs 510. Socket 120h is configured for connection to another hub (i.e., a "domain hub" not shown in FIG. 5). AC current, DC, or AC and DC current can simultaneously flow into or out of socket 120h. Socket 122h is configured for connection to a first AC power grid (e.g., 120 V AC). AC power can flow into or out of socket 122h. Socket 124h is configured for connection to a second AC power grid (e.g., 240 V AC). AC power can flow into or out of socket 124h. Socket 122h or 124h could be reconfigured to accept 480 V AC or higher.

FIG. 6 illustrates one embodiment of the hub relay switch system 504 of FIG. 5. In this embodiment, hub relay switch system 504 includes a crossbar switching matrix 602 that comprises relay switches CR1-CR17 controlled by respective signals cs1-cs17 provided by crossbar controller 604. Relay switches CR1-CR12 when closed can transmit AC current (e.g., 1 A, 10 A, 100 A, or more), and relay switches CR13-CR17 can transmit DC current (e.g., 1 A, 10 A, 100 A, or more). Although not shown, each of the relay switches CR1-CR17 has a corresponding return relay switch. A circuit loop can be formed between terminals of crossbar switching matrix 602 when relay switches and their corresponding return relay switches are closed by respective signals provided by crossbar controller 604. Although this embodiment uses relays as a switching method for routing power, other switching methods may be used in part or in whole to replace the relays, which could be, for example, MOSFETS.

As noted, hub relay switch system 504 is capable of connecting any pair of terminals thereof. Terminals of hub relay switch system 504 are respectively connected to sockets 120h-124h and charger plugs 510. Thus, hub relay switch system 504 is capable of connecting any two of sockets 120h-124h and charger plugs 510. For example, crossbar controller 604 can close relay switches CR7 and CR8 while the remaining relays are open, and AC power could pass from the AC grid via socket 122*h* through the plugs 510*c* and 510*d* to respective chargers 100. With relays CR13 and CR14 closed, DC current may flow between a pair of chargers 100 connected to plugs 510*a* and 510*b*, respectively. Switches CR7, CR13, and CR14 can be closed while the remaining relays are open. With these switches closed, DC current can flow between a pair of chargers 100 connected to plugs 510*a* and 510*b*, respectively, while AC current can flow can between a third charger 100 connected to plug 510*c* and an AC power grid via socket 122*h*. Both AC grid power and DC grid power are flowing through the hub 500 simultaneously. Other configurations are contemplated.

The battery pack 102, or more specifically the cells 302 of charger 100 can be recharged with power from anyone of many different sources including: EV charging stations; the public power grid; other chargers 100; battery packs of EVs; solar panels; etc. Or charger 100 can be used to provide power to anyone many different destinations including: battery packs of EVs; other chargers 100; household appliances that use AC power; the public power grid, etc. With continuing reference to FIGS. 1-4, FIGS. 7-25 illustrate several examples in which a charger 100 can be used as a source or destination of power.

Stationary charging stations can be few and far between for many EV owners. Range anxiety, as noted above, is a limiting factor for widespread adoption of EVs. Charger 100 can address range anxiety. Charger 100 can be configured to be a portable charger, stored in the trunk of an EV, and used if needed to recharge the battery of the EV if a stationary charging station is not nearby. FIG. 7 shows charger 100 plugged into example EV 700. FIG. 7 also shows battery pack 102 of charger 100, and battery pack 702 of EV 700. Battery pack 102 is shown fully charged in FIG. 7, while battery pack 702 is nearly empty of charge. After EV plug 116 is received into the appropriate socket of EV 700, the user can configure charger 100 to recharge pack 702 using any one of several different charging methods such as DC level-3 charging. In one embodiment, user interface 112 is in wireless data communication with the user's smart phone, which implements an application for controlling charger 100. This application when started on the smart phone may suggest one of several distinct methods for charging battery pack 702 using charger 100. For example, the application may suggest recharging battery pack 702 using DC level-3 charging. In response to receiving a command via the smart phone and user interface 112, charger controller 110 configures DC/DC converter system 106 for converting Vbat into Vout with a magnitude that is appropriate for battery pack 702. In addition, charger controller 110 sends a command to relay switch controller 202. In response, relay switch controller 202 asserts control signals s3 and s13, which in turn close relay switches R3 and R13, respectively. Once these relay switches are closed, charger controller 110 sends a command to battery management circuit 322, and in response battery management circuit activates switch S9, which enables DC current Idc to flow through it and the diode of switch S10 from battery pack 102 to battery pack 702 via DC/DC converter 106 and plug 116. FIG. 8 shows DC current Idc charging battery pack 702. Charging continues until the charge on battery pack 102 reaches a minimal threshold, at which point battery management circuit 322 deactivates switch S9 and the charging process stops. FIG. 8 shows battery pack 102 substantially depleted, and battery pack 702 partially recharged. Instead of suggesting DC level-3 charging, the application could have suggested recharging battery pack 702 using AC level-1 charging. To implement AC level-1 charging, charger controller 110 configures AC/DC converter system 104 for converting DC voltage Vbat into AC voltage Vac with a magnitude that is appropriate for AC level-1 charging. In addition, charger controller 110 sends a command to relay switch controller 202. In response, relay switch controller 202 asserts control signals s2, s5, s6, and s4, which in turn close relay switches R2, R4, R5, and R6, respectively. Once these relay switches are closed, charger controller 110 then sends a command to battery management circuit 322, and in response battery management circuit activates switch S9, which enables DC current Idc to flow from battery pack 102 to AC/DC converter 104, where it is converted to AC current for charging battery pack 702.

FIG. 9 shows charger 100 plugged into an EV 700. FIG. 9 also shows charger 100 plugged into a household electrical distribution system 802 via a 120 V AC plug 804. The household electrical distribution system 802 is connected to a power grid via a utility drop 800. Initially, battery packs 102 and 702 are substantially empty. Charger 100 can recharge battery pack 702 using, for example, AC level-1 charging. In response to receiving a command from charger controller 110, relay switch controller 202 closes switch relays R4, R6 and R7, while the other switch relays shown in FIG. 2 remain open. With switch relays R4, R6 and R7 closed, 120 V, AC current Iac can be transmitted from utility drop 802 to EV battery pack 702 via household electrical distribution system 802 and charger 100. Iac continues to flow until EV battery 702 is recharged. Once EV battery 702 is recharged as shown in FIG. 10, charger 100 can recharge its battery pack 102. To that end relay switch controller 202 opens switch relays R6 and R4 and closes switch relays R2, R5, and R7 in response to receiving the command from charger controller 110. AC/DC converter system 104 is configured by charger controller 110 to convert the 120 V AC power provided to socket 122*c* via plug 804, into a DC voltage Vbat with a magnitude that is appropriate for charging battery pack 102 in accordance with a charging algorithm. Once battery management circuit 322 detects that the voltage across cells 320 has reached an appropriate charging state, battery management circuit 322 deactivates switch S10, and the process for recharging battery pack 102 stops. FIG. 10 shows battery pack 702 after it is fully charged, and battery pack 102 as it is being charged.

Figure 11:
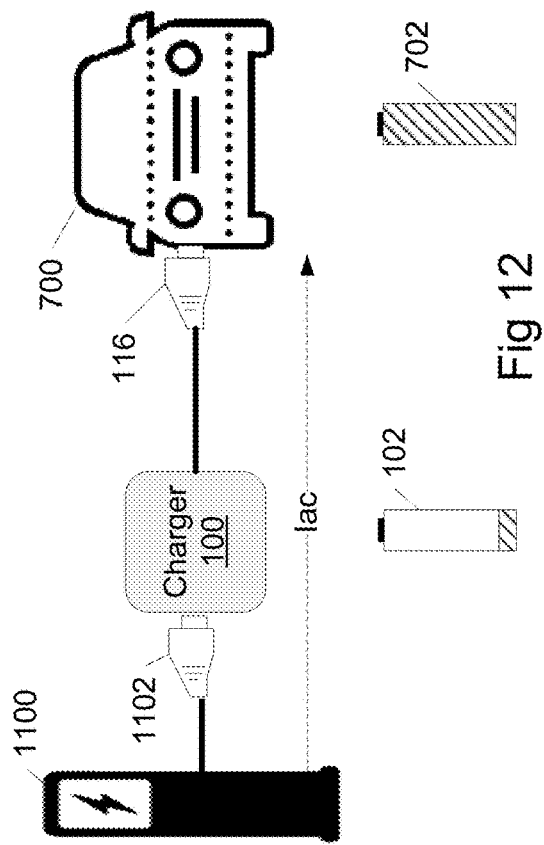
FIGS. 11-13 show the charger of FIG. 1 connected between an example EV and an example charging station.
Figure 12:
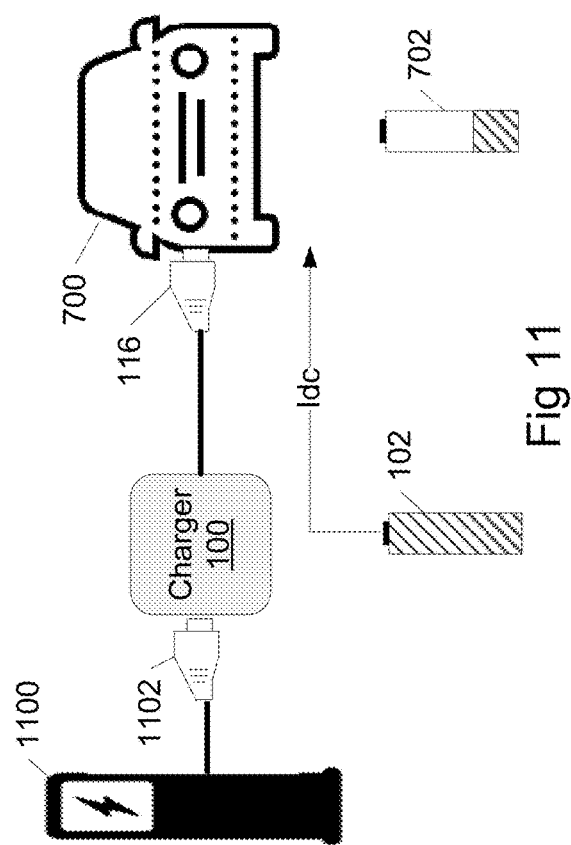
Figure 13:
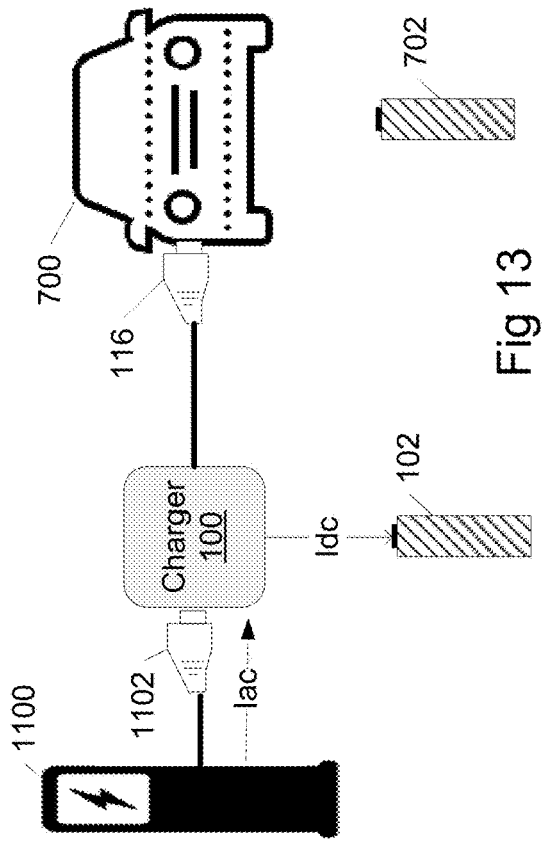

FIG. 11 shows charger 100 configured in its portable configuration plugged into an EV 700 via plug 116 and a stationary charging station 1100 via plug 1102 and socket 126*c*. In the illustrated example, stationary charging station 1100 provides AC level-1 charging only. Initially, the battery pack 702 of EV 700 is partially empty while battery pack 102 is full. With continuing reference to FIG. 2, in response to receiving a command from charger controller 110, relay switch controller 202 closes switch relays R3 and R13 in order to recharge battery pack 702 using DC level-3 charging. DC/DC converter system 106 is configured by charger controller 110 to convert Vbat into DC voltage Vout with a magnitude that is compatible with DC level-3 recharging and a charging profile for EV battery pack 702. Finally, battery management circuit 322 closes switch S9 so that DC current Idc can flow from battery pack 102 to battery pack 702 in response to receiving a command from charger controller 110. Charger battery pack 102 does not have enough energy to fully recharge EV battery pack 702. When battery management circuit 322 detects that cells 320 have been depleted to a minimal threshold voltage, battery management circuit deactivates switch S9. Relay switch controller 202 opens switch relay R3, and closes switch relays R4, R6, and R9 in response to receiving a command from charger controller 110. With relay switches R4, R6, and R9 closed, AC charging Iac flows from stationary charger 1100 through charger 100 to EV 700 as shown in FIG. 12. It is noted that EV 700 has an internal AC/DC converter that converts the AC current provided by charger 1100 into DC power for charging battery pack 102. Relay switch controller 202 opens switch relays R6 and R4 after charger controller 110 learns that battery pack 702 is fully recharged. Relay switch controller 202 opens all relay switches except switch relay switches R9, R5, and R2 in response to receiving a command from charger controller 110 after it learns that EV battery pack 702 is fully charged. In response to receiving a command from charger controller 110, battery management circuit 322 activates switch S10. Then charger controller 110 configures AC/DC converter 104 to convert the AC voltage provided by stationary charger 1100 into DC voltage Vbat with a magnitude that is compatible for charging cells 302 of battery pack 102. Once battery management circuit 322 detects that the voltage across cells 320 has reached an appropriate state, battery management circuit 322 deactivates switch S10, and the process for recharging battery pack 102 stops. FIG. 13 shows battery pack 102 at the point in time where it is fully recharged.

Figure 14:
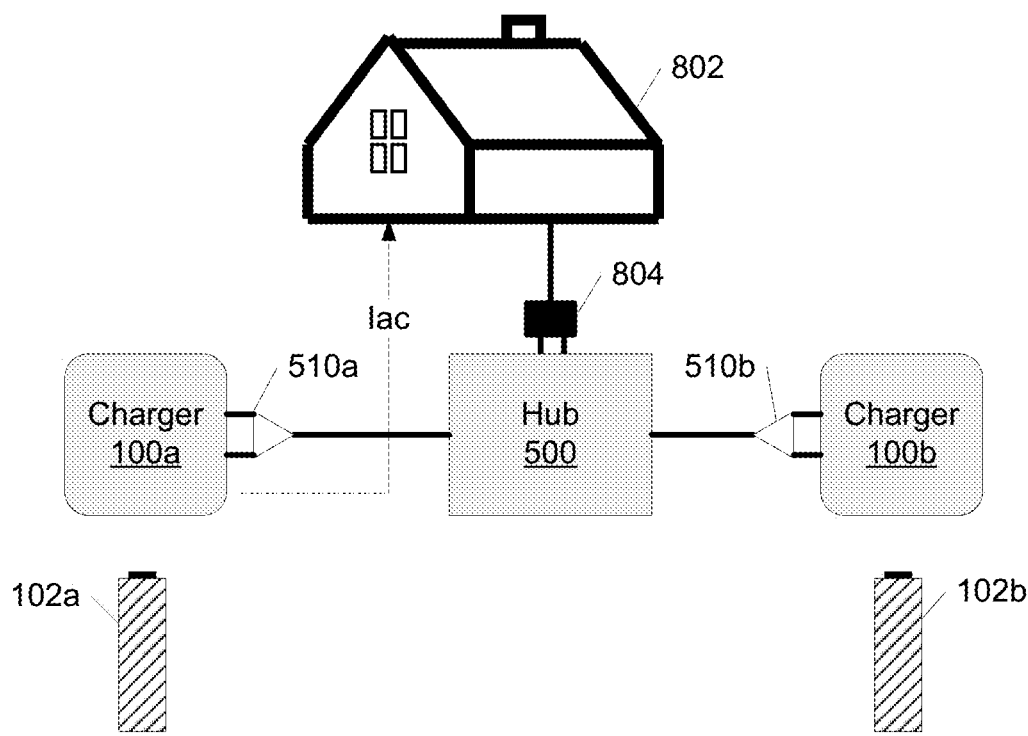
FIGS. 14 and 15 show the hub of FIG. 5 connected to chargers of FIG. 1 and a household electrical distribution system.
Figure 15:
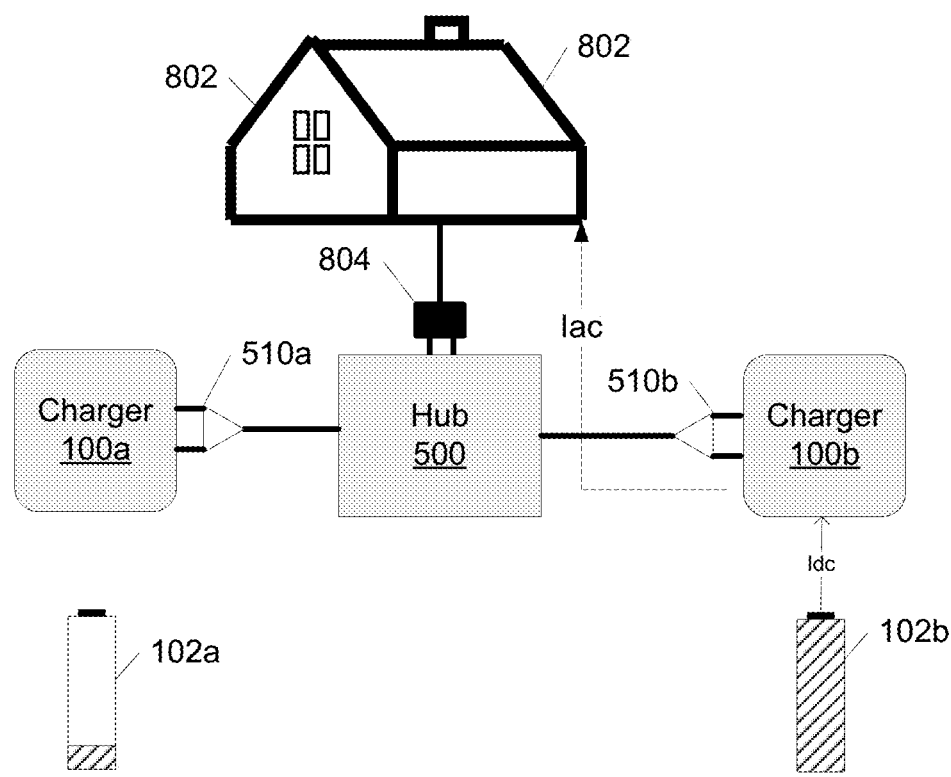

Hubs enable power transfer. Several chargers 100 can be interconnected through a hub like that shown in FIG. 6. The hub enables power distribution between the chargers. FIG. 14 illustrates a pair of chargers 100 interconnected by hub 500, which in turn is connected to household electrical distribution system 802 via plug 804. With continuing reference to FIGS. 2 and 6, FIG. 14 shows plug 510a received by socket 120c-a of charger 100a, and plug 510b received socket 120c-b of charger 100b. FIG. 14 also shows battery packs 102 of chargers 100 are full. Battery packs 102 can supply power to household electrical distribution system 802 during, for example, a power blackout. Power can be supplied directly from a charger 100 or indirectly via hub 500. FIGS. 14 and 15 will be described with reference to chargers 100 supplying power to household electrical distribution system 802 via hub 500.

In response to commands received from a user's smart phone or other device, hub controller 502 configures crossbar controller 604 to close switch relay CR1, which in turn is connected to plug 510a. In response to receiving an appropriate command from hub controller 502, charger controller 110a configures AC/DC converter 104, battery management system 322a, and relay switch system 114a of charger 110a. AC/DC converter 104a is configured to convert Vbat provided by battery pack 102b into Vac with a voltage magnitude that is appropriate for system 802. Battery management system 322a activates switch S9. Relay switch controller 202a closes switch relays R1 and R2. In this configuration AC current Iac is transmitted from battery pack 102a to system 802 via hub 500 via plugs 510a and 804 as shown in FIG. 14. After battery pack 102a is depleted as shown in FIG. 15, hub controller 502 instructs crossbar controller 604 to open switch relay CR1, and to close switch relay CR2. Then hub controller 502 instructs charger controller 110b to configure charger 100b in substantially the same manner so that charger 100b can supply household electrical distribution system 802 with AC power. When charger 100b is configured, AC current flows from battery pack 100b to system 802 via hub 500 and plug 804. FIG. 15 shows AC current Iac flowing from battery pack 102b. When battery management circuit 322b detects the voltage level across cells 320 has fallen below a predetermined value, battery management circuit 322b opens or deactivates switch S9, and informs the charger controller.

Figure 16:
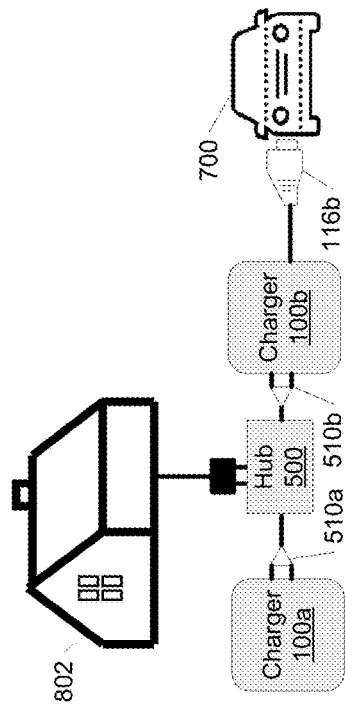
FIGS. 16-19 show the hub of FIG. 5 connected to chargers of FIG. 1, an EV, and a household electrical distribution system.
Figure 17:
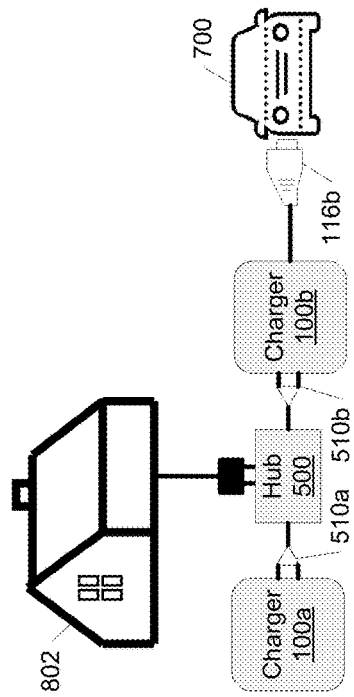

FIGS. 14 and 15 illustrate hub 500 transmitting AC current provided by chargers 100. Hub 500 can be configured to transmit DC current. FIG. 16 illustrates the pair of chargers 100 of FIGS. 14 and 15, along with EV 700, which is plugged into charger 100b. Battery packs 102 of chargers 100 are initially full. Battery packs 102a and 102b can supply DC power to EV 700 for DC level-3 charging. In response to commands received from a user's smart phone or other device, hub controller 502 configures crossbar controller 604 to close switch relays CR13 and CR14, which in turn are connected to plugs 510a and 510b. In response to receiving an appropriate command from hub controller 502, charger controller 110a configures DC/DC converter 106a, battery management system 322a, and relay switch system 114a of charger 110a. DC/DC converter 106a is configured to convert Vbat provided by battery pack 102a into DC voltage Vout with a magnitude that is appropriate for DC level-3 charging of battery pack 702. Battery management system 322a activates switch S9. Relay switch controller 202a closes switch relays R15 and R3. Relay switch controller 202b, upon receiving commands from charger controller 110a that had subsequently received commands from the hub controller 502, closes switch relays R13 and R15 in charger 100b. In this configuration DC current Idc is transmitted from battery pack 102a to battery pack 702 via hub 500, and plugs 510a and 510b as shown in FIG. 16. After battery pack 102a is depleted, charger controller 110a informs hub controller 502 that battery pack 102a has been fully discharged. Hub controller 502 instructs charger controller 110b to configure DC/DC converter 106b, battery management system 322b, and relay switch system 114b to charge battery pack 702 with DC current from charger 100b. FIG. 17 shows battery pack 702 being recharged with DC current Idc provided by charger 100b.

Figure 18:
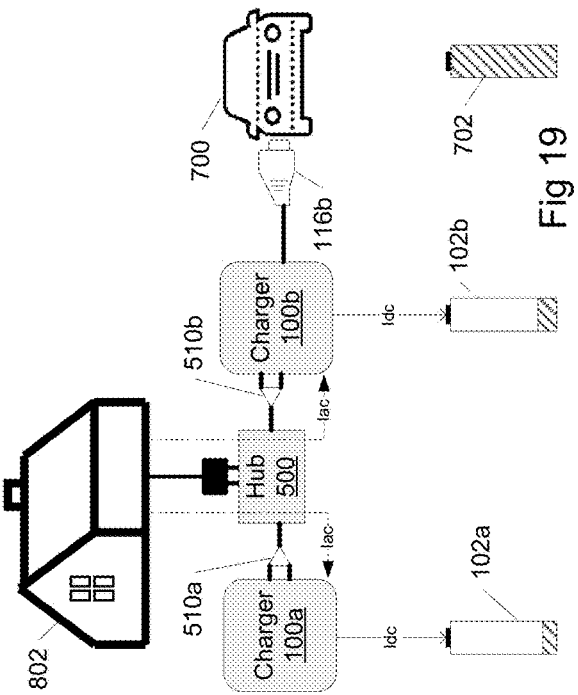
Figure 19:
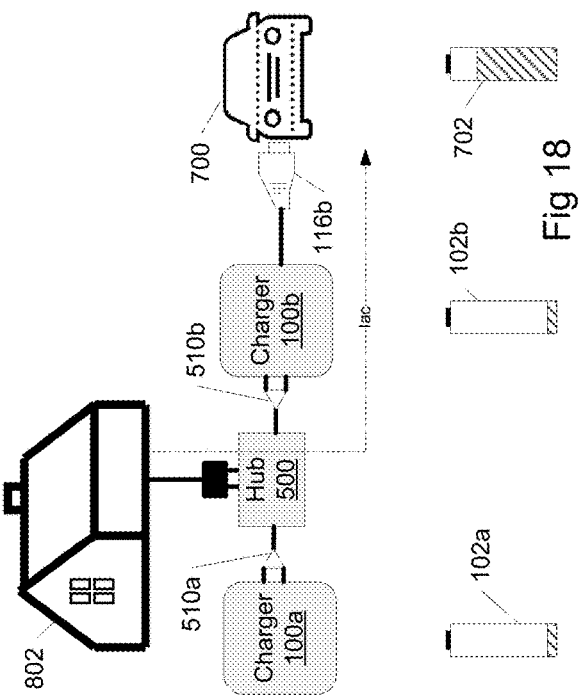

When battery management circuit 322b detects the voltage level across cells 320b has fallen below a predetermined value, battery management circuit 322b opens or deactivates switch S9, and informs charger controller 110b. In response, charger controller 110 informs hub controller 502 that battery pack 102b has been fully discharged. Hub controller 502 detects battery pack 702 is not fully recharged. In response hub controller 502 configures hub 500 to transfer AC power from system 802 to EV battery pack 702 for level-1 charging. In response, crossbar controller 604 opens all switch relays except for switch relay CR2, which connects socket 124h and plug 510b. In this configuration of 500 and transmit AC power from the grid distribution system 802 to EV 700. In addition, hub controller 502 configures charger 100b for transferring AC power from hub 502 EV 700 via plug 116b. In response to receiving an instruction from charger controller 110b, relay switch controller 202b closes switch relays R1, R4, R5, and R6 thereby creating a conductive path between socket 120c-b and EV plug 116b. AC current Iac then flows from system 802 to EV 700 as shown in FIG. 18. Eventually, EV 700 informs charger 100b when it's battery 702 is fully charged. Empty battery packs 102a and 102b can then be recharged via hub 500 and chargers 100a and 100b, respectively, in substantially the same fashion as described above with reference to FIGS. 10 and 13.

Figure 20:
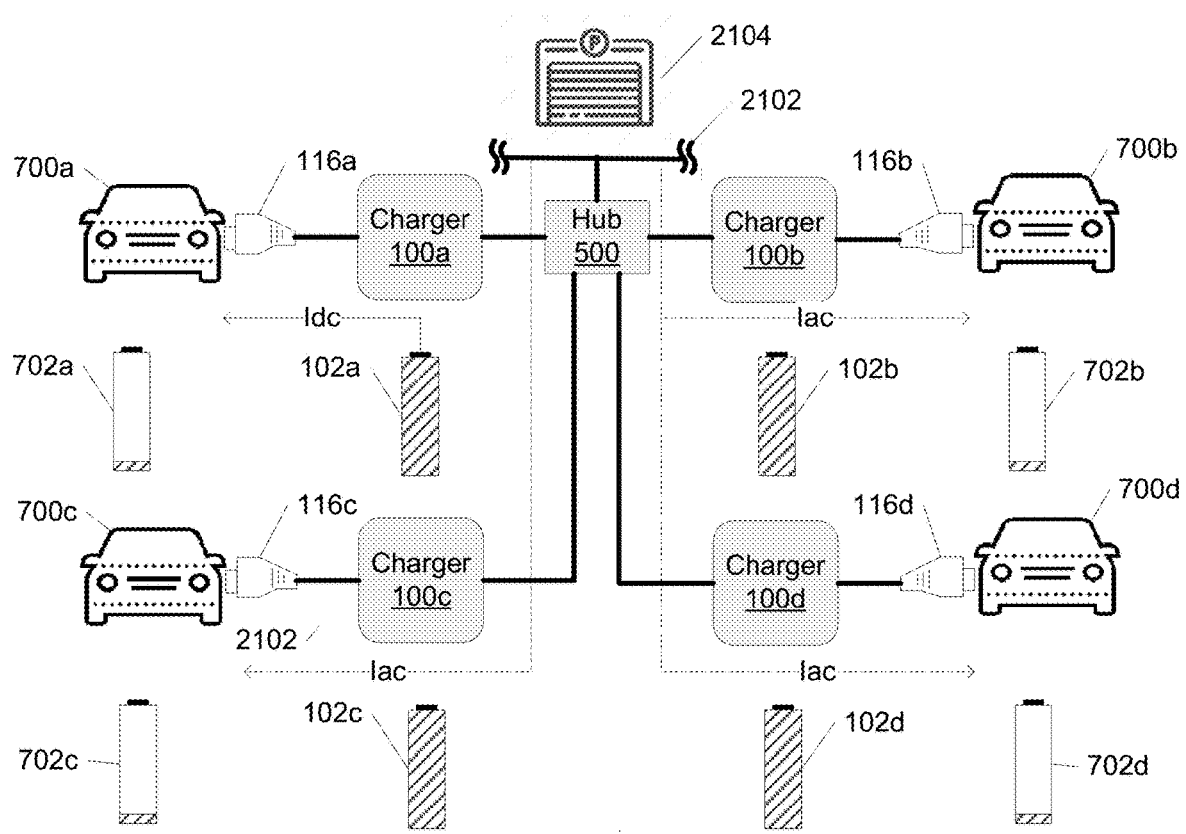
FIGS. 20-24 show the hub of FIG. 5 connected to chargers of FIG. 1, and an example power grid.

Hub 500 can dynamically adjust power transfer based on inputs from multiple users of chargers 100 connected thereto. FIG. 20 illustrates a hub 500 connected and configured to receive AC power from a power grid 2102 of a building such as a parking garage 2104. Hub 500 includes plugs 510a-510d inserted into respective sockets 120c-a-120c-d, respectively, of chargers 100a-100d, respectively. This enables hub 500 to transfer power between chargers 100a-100d. Initially battery packs 102a-102d are fully charged. Chargers 100a-100d are plugged into EVs 700a-700d, respectively, via plugs 116a-116d, respectively. Battery packs 702a-702d are essentially empty of charge.

The hub controller 502 of hub 500 receives charging requests from owners of EVs 700a-700d via their smart phones. Three users request AC level-2 charging of battery packs 702b, 702c, and 702d. The last user requests fast DC level-3 charging of battery pack 702a. In response to receiving these requests, hub controller 502 configures hub relay switch system 504 to connect socket 122h, which is connected to the power grid 2102, to plugs 510b-510d. Hub 500 also configures chargers 100a-100d. To this end, hub controller 502 sends respective commands to each of the charger controllers 110 in chargers 100a-100d. Charger controllers 110b-110d, in response to receiving their respective commands, configure chargers 100b-100d to charge battery packs 702b-702d, respectively, using AC level-2 charging with power provided by power grid 2102. Charger controller 110a, in response to receiving its command, configures charger 100a to charge battery pack 702a using DC level-3 charging with power provided by battery pack 102a. FIG. 20 shows power transfer after chargers 100a-100d are configured by hub controller 502. As shown, battery packs 702b-702d are being recharged through hub 500 using AC level-2 power, while battery pack 702a is being charged using DC level-3 power.

Figure 21:
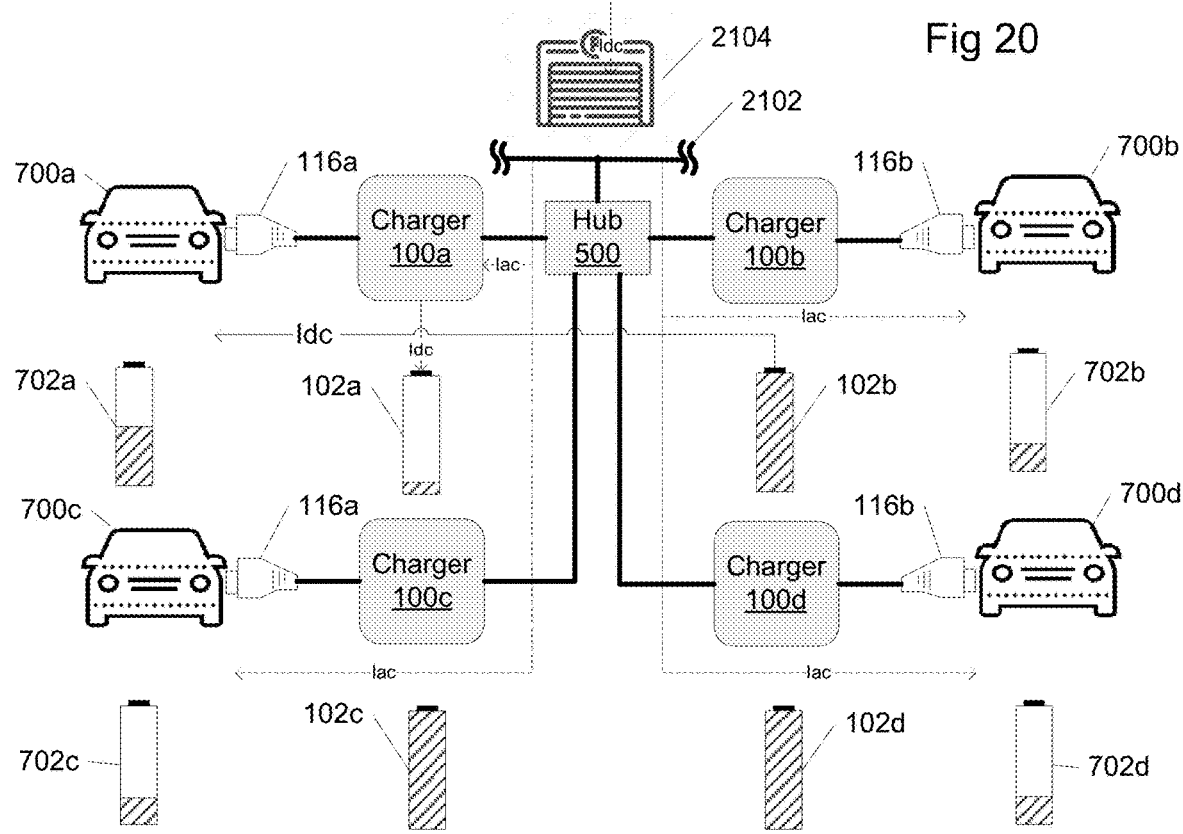
Figure 22:
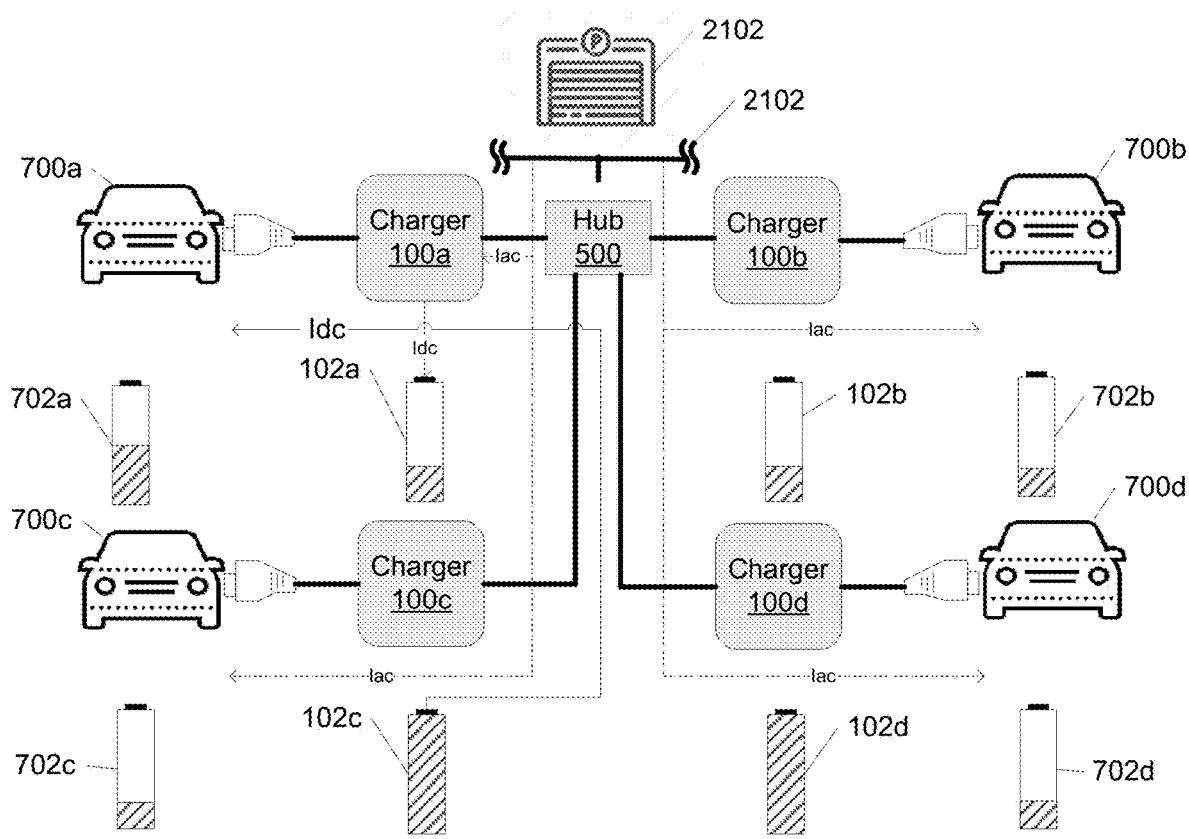
Figure 23:
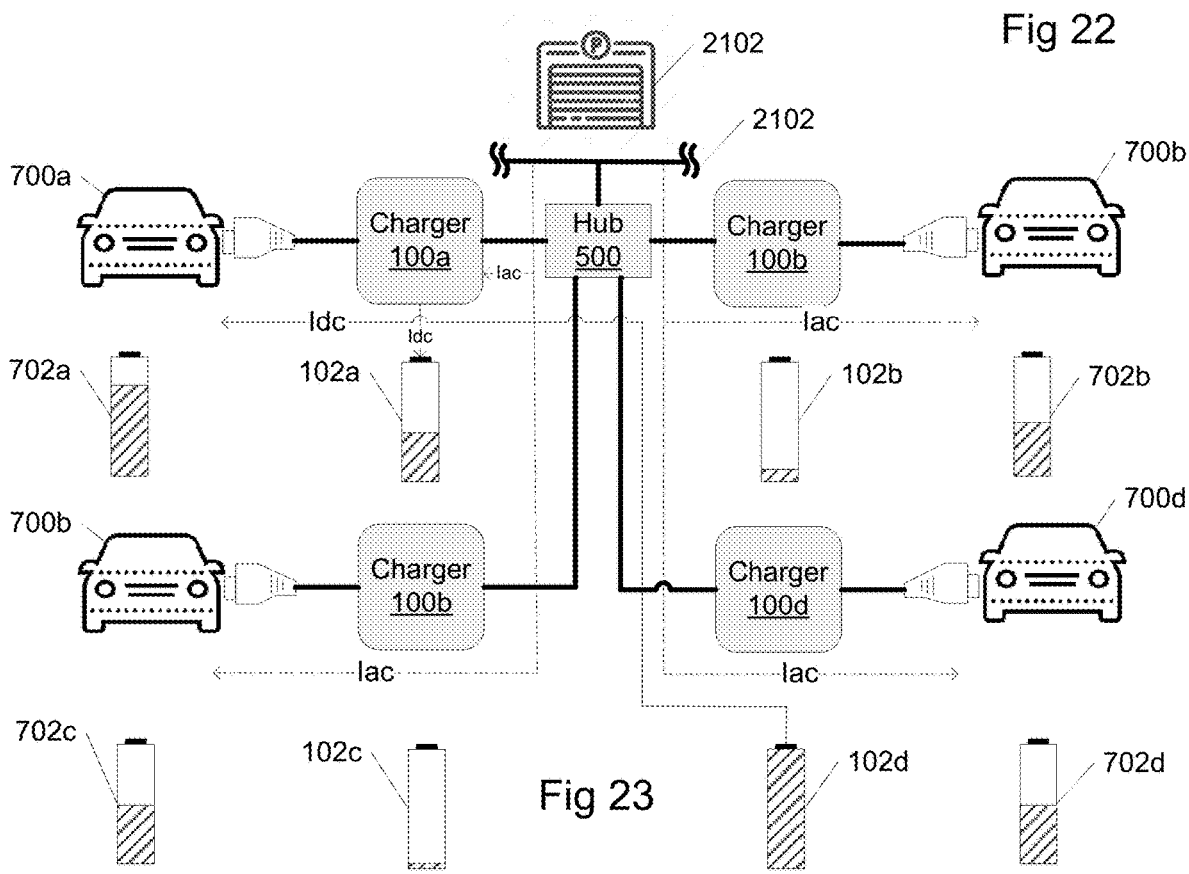
Figure 24:
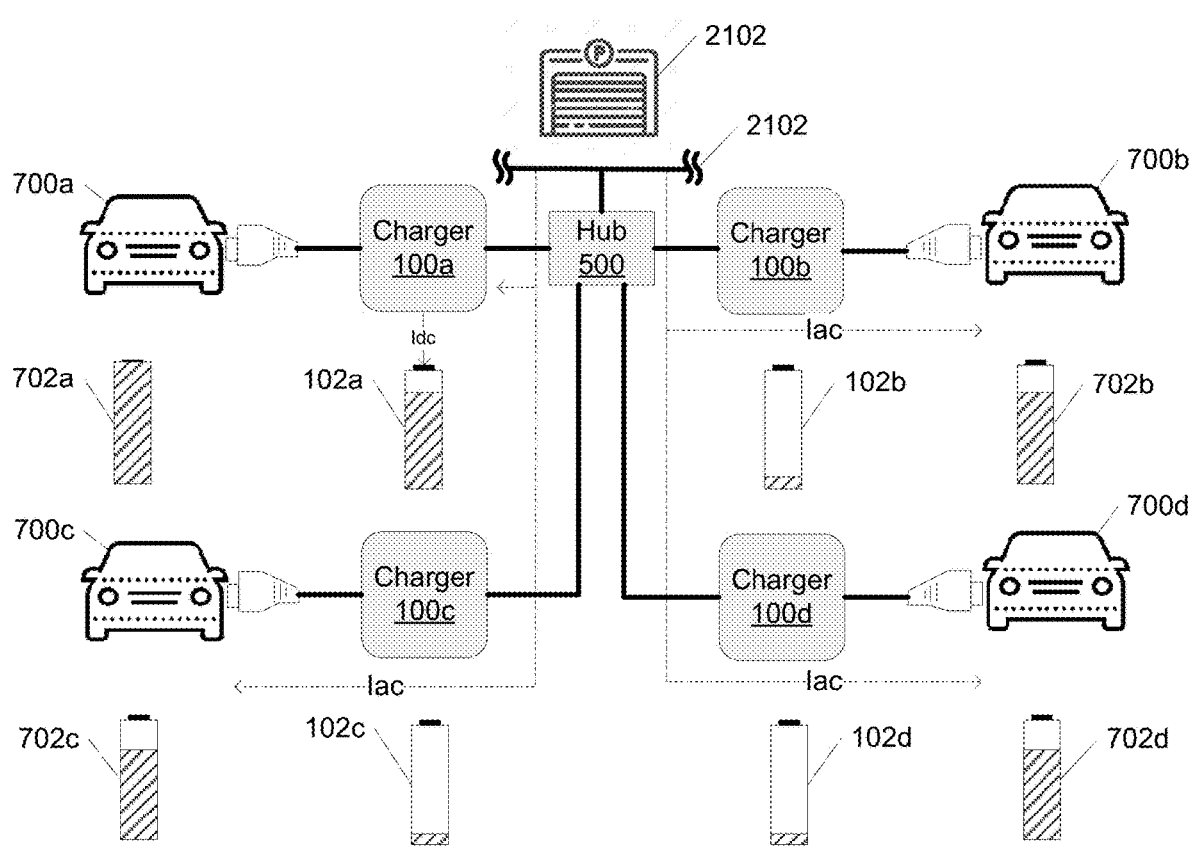

Eventually, charger battery pack 102a is depleted. However, EV battery packs 702a remains less than fully recharged. Charger 100a informs hub controller 502 that battery pack 102a is depleted. Hub controller 502, in response, reconfigures its relay switch system 114 and charger 100b. Hub controller 502 sends a command to charger 100b to charge battery pack 702a using DC level-3 charging with DC power provided by battery pack 102b, while battery pack 702b continues to be recharged with AC level-2 power. FIG. 21 shows power transfer after charger 100b is reconfigured by hub controller 502. Battery packs 702b, 702c and 702d continue to be recharged through hub 500 using AC level-2 power, while battery pack 702a is charged using DC level-3 power provided by charger 100b. Meanwhile, hub controller 502 determines that providing AC power to recharge battery back 102a will not affect the power output of level-2 charging of packs 702b, 702c, and 702d, so it directs AC power to charger 100a to be used to recharge pack 102a. Eventually, charger battery pack 102b is depleted. However, EV battery packs 702a remains only partially recharged. Charger 100b informs hub controller 502 that battery pack 102b is depleted. Hub controller 502, in response, reconfigures its relay switch system 602 and chargers 100b and 100c. Hub controller 502 sends a command to charger 100c to charge battery pack 702a using DC level-3 charging with power provided by battery pack 102c, while battery pack 702c continues to be recharged with AC level-2 power. FIG. 22 shows power transfer after chargers 100b and 100c are reconfigured by hub controller 502. Battery packs 702b, 702c, and 702d continue to be recharged through hub 500 using AC level-2 power, while battery pack 702a is being charged using DC level-3 power provided by charger 100c. Eventually, charger battery pack 102c is depleted. However, EV battery packs 702a remains only partially recharged. Charger 100c informs hub controller 502 that battery pack 102c is depleted. Hub controller 502, in response, reconfigures its relay switch system 602, and chargers 100c and 100d. Hub controller 502 sends a command to charger 100d to charge battery pack 702a using DC level-3 charging with power provided by battery pack 102d, while battery pack 702d continues to be recharged with AC level-2 power. FIG. 23 shows power transfer after chargers 100c and 100d are reconfigured by hub controller 502. Battery packs 702b, 702c, and 702d continue to be recharged through hub 500 using AC level-2 power, while battery pack 702a is charged using DC level-3 power provided by charger 100d. Eventually, charger battery pack 102d is depleted. However, EV battery packs 702a is now fully recharged. Charger 100d informs hub controller 502 that battery pack 102d is depleted. Hub controller 502, in response, reconfigures its relay switch system 602, and chargers 100a and 100d. FIG. 24 shows power transfer after chargers 100a and 100d are reconfigured by hub controller 502. Battery packs 702b-702d continue to be recharged through hub 500 using AC level-2 power.

Figure 25:
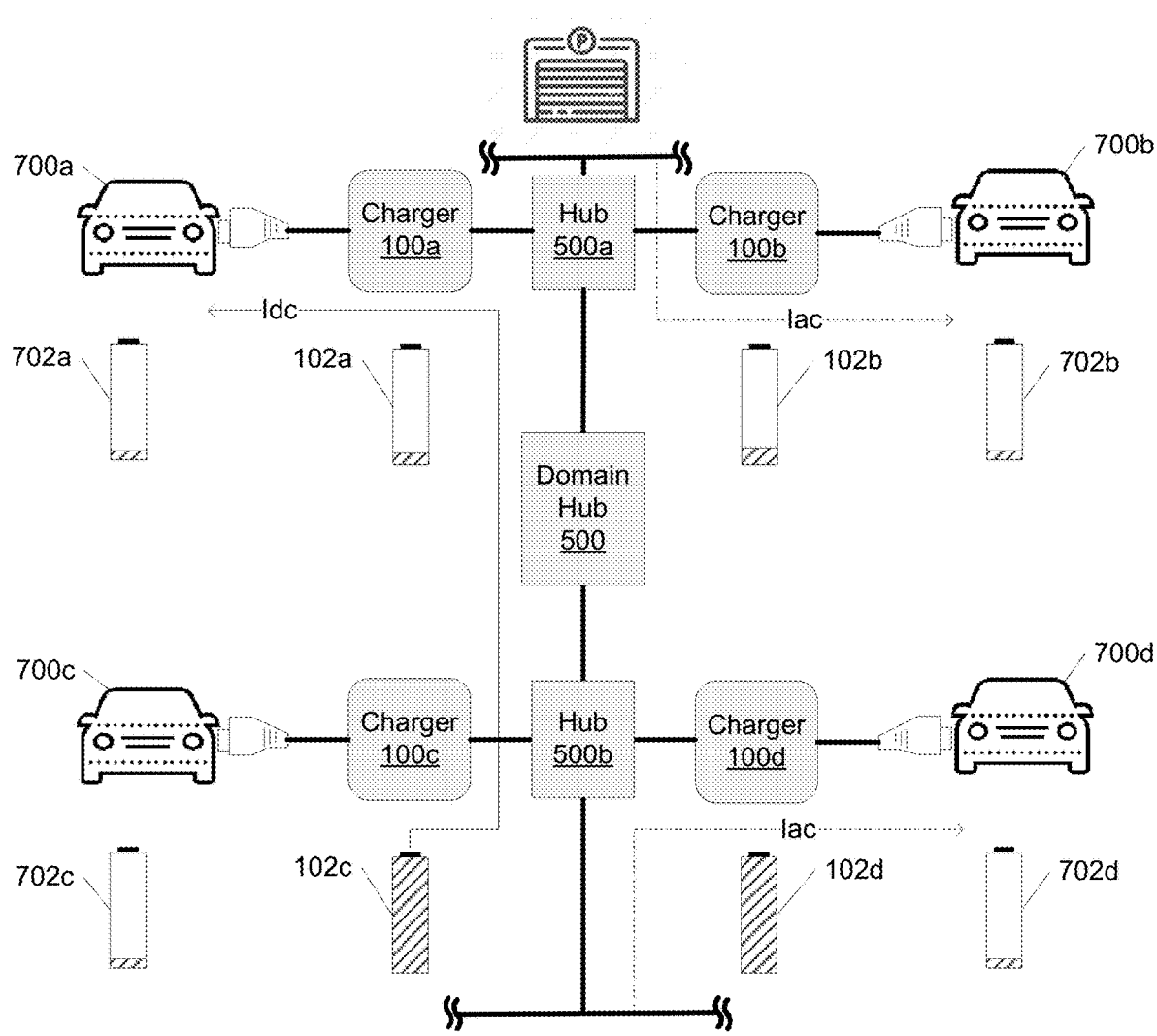
FIG. 25 illustrates a domain hub of FIG. 5 connected to and configured to control subnetwork hubs.

Hub 500 in FIGS. 20-24 dynamically distributes power between chargers 100 based upon inputs received from users. Hubs can also dynamically distribute power between sub hubs. To illustrate FIG. 25 shows a "domain hub" 500c connected to and configured to control hubs 500a and 500b. Domain hub 500c creates a power network in which power can be dynamically between distributed between power subnetworks that are defined by hubs 500a and 500b, respectively. Hub 500a interconnects chargers 100a and 100b, which in turn are connected to EVs 700a and 700b. In addition, hub 500a is connected to power grid 2102 and domain hub 500c. Hub 500b interconnects 100c and 100d, which in turn are connected to EVs 700c and 700d. Hub 500b is also connected to power grid 2102 and domain hub 500c.

Domain hub 500c enables power transfer between power subnetworks. To illustrate, the owner of EV 700a requests DC level-3 charging of battery pack 702a. Battery packs 102a and 102b of chargers 100a and 100b, respectively, are depleted and cannot provide power for DC level-3 charging battery pack 702a. Battery pack 102c, however, is fully charged and can provide power for DC level-3 charging. In response to receiving the owner's request, domain hub controller 502c configures hub relay switch system 602c to connect hubs 500a and 500b. Domain hub controller 502c also configures hubs 500a and 500b, and chargers 100a and 100c to create a conduction path through which DC current can be transmitted from battery pack 102c to 702a via domain hub 500c as shown in FIG. 25. Once configured, DC current is transmitted to battery pack 702a for DC level-3 charging.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. An apparatus comprising:
   a first electric vehicle (EV) connector for transferring direct current (DC) power to an EV;
   a first connector for receiving DC power;
   a first alternating current and direct current (AC/DC) converter;
   a first DC/DC converter;

a first rechargeable battery system comprising a rechargeable battery, wherein the rechargeable battery system is coupled to the AC/DC and DC/DC converters;
a first switch system;
a first controller coupled to and configured to control the AC/DC converter, the DC/DC converter, and the switch system;
wherein the first switch system is configured to connect the first DC/DC converter to the first EV connector for transferring DC power therebetween;
wherein the first switch system is configured to connect the first connector to the first EV connector so that DC power can be directly transferred between the first EV connector and the first connector via the first switch system.

2. The apparatus of claim 1 wherein the DC/DC converter is a bidirectional DC/DC converter system.

3. The apparatus of claim 1 wherein the first switch system is configured to connect the first DC/DC converter to the first connector for transferring DC power therebetween.

4. The apparatus of claim 1 wherein the AC/DC converter comprises a bidirectional AC/DC converter system.

5. The apparatus of claim 4:
wherein the bidirectional AC/DC converter system is configured to charge or discharge the rechargeable battery;
wherein the DC/DC converter is configured only to discharge the rechargeable battery.

6. The apparatus of claim 5 wherein the bidirectional AC/DC converter comprises:
a first pair of terminals coupled to the first switch system;
a second pair of terminals connected to terminals of the rechargeable battery;
first converter coupled to a second converter, a combination of which is connected between the first pair of terminals and the second pair of terminals;
wherein the first converter is configured to operate as a rectifier or an inverter based on first control signals provided by the first controller;
wherein the second converter is configured to operate as a buck converter or a boost converter based on second control signals provided by the charger controller.

7. The apparatus of claim 6 wherein the DC/DC converter comprises:
input terminals coupled to the terminals of the rechargeable battery;
output terminals coupled to the first switch system;
wherein the DC/DC converter is configured to convert an input DC voltage provided by the rechargeable battery at the input terminals into an output DC voltage at the output terminals;
wherein a magnitude of the output DC voltage is dependent on a magnitude of the input voltage and a DC/DC control signal provided by the first controller.

8. The apparatus of claim 1 further comprising:
a hub for transmitting DC power between connectors thereof, the hub comprising:
a first hub connector electrically connected to the first connector;
a second hub connector;
a hub switch system;
a hub controller coupled to and configured to control the hub switch system;
wherein the hub switch system is configured to connect the first and second hub connectors for transferring DC power directly between the first and second hub connectors via the hub switch system.

9. The apparatus of claim 8 wherein the first hub connector comprises a hub socket, and wherein at least one of the first and second hub connectors comprises a first plug.

10. The apparatus of claim 8 further comprising:
a second electric vehicle (EV) connector;
a second connector electrically connected to the second hub connector;
a second AC/DC converter;
a second DC/DC converter;
a second rechargeable battery system comprising a second rechargeable battery, wherein the second rechargeable battery system is coupled to the second AC/DC and DC/DC converters;
a second switch system;
a second controller coupled to and configured to control the second AC/DC converter, the second DC/DC converter, and the second switch system;
wherein the second switch system is configured to connect the second DC/DC converter to the second connector for transferring DC power therebetween;
wherein the second switch system is configured to connect the second DC/DC converter to the second EV connector for transferring DC power therebetween;
wherein the second switch system is configured to connect the second connector to the second EV connector.

11. The apparatus of claim 10 wherein the first controller and the second controller are configured for data communication with the hub controller.

12. The apparatus of claim 10 wherein the second switch system is configured to connect the second DC/DC converter to the second connector while the second and third hub connectors are connected together.

13. An apparatus comprising:
a first electric vehicle (EV) connector;
an alternating current and direct current (AC/DC) converter;
a DC/DC converter:
a rechargeable battery system comprising a rechargeable battery, wherein the rechargeable battery system is coupled between the AC/DC and DC/DC converters;
a switch system;
a hub for transmitting direct current (DC) power and alternating current (AC) power between terminals, comprising:
a hub switch system comprising a plurality of hub terminals and a plurality of switches, wherein the hub switch system is configured to selectively connect any pair of hub terminals of the plurality;
a hub controller coupled to and configured to control the bub switch system;
a plurality of hub connectors coupled to the plurality of hub terminals, respectively;
wherein a first hub connector of the plurality is configured for connection to a first connector;
wherein a second hub connector of the plurality is configured for connection to a second connector;
wherein a third hub connector of the plurality is configured for connection to an AC power source; the first connector connected to the first hub connector and configured to transmit DC power therebetween;
wherein the switch system is configured to connect the DC/DC converter to the first EV connector for transferring DC power therebetween;
wherein the switch system is configured to connect the first connector to the first EV connector for transferring DC power directly between the first connector and the first EV connector via the switch system.

14. The apparatus of claim 13 wherein the switch system is configured to connect the DC/DC converter to the first connector for transferring DC power therebetween.

15. The apparatus of claim 14 wherein the DC/DC converter is a bidirectional DC/DC converter system.

16. The apparatus of claim 13:
   wherein the AC/DC converter comprises a bidirectional AC/DC converter system;
   wherein the bidirectional AC/DC converter system is configured to charge or discharge the rechargeable battery.

* * * * *